(12) United States Patent
Japa et al.

(10) Patent No.: US 12,164,873 B2
(45) Date of Patent: Dec. 10, 2024

(54) SYSTEM AND METHOD FOR HYBRID QUESTION ANSWERING OVER KNOWLEDGE GRAPH

(71) Applicant: AT&T Intellectual Property I, L.P., Atlanta, GA (US)

(72) Inventors: Sai Sharath Japa, Carrollton, TX (US); Roderic William Paulk, Wylie, TX (US); Joseph Samuel Miller, Dallas, TX (US); Lal Payyappilly Paul, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 604 days.

(21) Appl. No.: 17/197,928

(22) Filed: Mar. 10, 2021

(65) Prior Publication Data
US 2022/0292262 A1 Sep. 15, 2022

(51) Int. Cl.
*G06F 17/00* (2019.01)
*G06F 16/33* (2019.01)
(Continued)

(52) U.S. Cl.
CPC ........ *G06F 40/295* (2020.01); *G06F 16/3347* (2019.01); *G06N 3/042* (2023.01);
(Continued)

(58) Field of Classification Search
CPC ..... G06F 40/295; G06F 16/3347; G06N 3/04; G06N 3/042; G06N 5/02; G06N 5/04
(Continued)

(56) References Cited

U.S. PATENT DOCUMENTS

| 2018/0342174 A1 | 11/2018 | Zhang et al. |
| 2020/0034436 A1 | 1/2020 | Chen et al. |

(Continued)

OTHER PUBLICATIONS

"Resource Description Framework (RDF): Concepts and Abstract Syntax", https://www.w3.org/TR/rdf-concepts, Feb. 25, 2014, 19 pages.

(Continued)

*Primary Examiner* — Paul C McCord
(74) *Attorney, Agent, or Firm* — Guntin & Gust, PLC; Kenneth S. Kwan

(57) ABSTRACT

Aspects of the subject disclosure may include, for example, identifying an entity of a natural language question, locating a node of a knowledge graph corresponding to the entity, and generating a candidate answer set including a group of other entities located a predetermined proximity to the node. Contextual information for the group of other entities is determined from the knowledge graph, and the natural language question and contextual information are separately encoded to obtain separate encoded vectorial representations of the natural language question and members of the candidate answer set. The encoding uses pre-trained language model embeddings obtained via a bidirectional encoder representations from transformer encoding process. The encoded vectorial representations of the question under an influence of aspects of the contextual information are scored and a member of the candidate answer set selected according to the score to obtain an answer to the original question. Other embodiments are disclosed.

20 Claims, 11 Drawing Sheets

(51) Int. Cl.
G06F 40/295 (2020.01)
G06N 3/042 (2023.01)
G06N 3/08 (2023.01)
G06N 5/02 (2023.01)
G06N 5/04 (2023.01)

(52) U.S. Cl.
CPC .............. G06N 3/08 (2013.01); G06N 5/02 (2013.01); G06N 5/04 (2013.01)

(58) Field of Classification Search
USPC .......................................................... 704/9
See application file for complete search history.

(56) References Cited

U.S. PATENT DOCUMENTS

| | | | |
|---|---|---|---|
| 2020/0242444 A1 | 7/2020 | Zhang et al. | |
| 2020/0293874 A1 | 9/2020 | Ji et al. | |
| 2020/0311353 A1 | 10/2020 | Li et al. | |
| 2021/0019704 A1 | 1/2021 | Kong et al. | |
| 2021/0049236 A1 | 2/2021 | Nguyen et al. | |
| 2021/0182489 A1* | 6/2021 | Barkan | G06N 3/08 |
| 2021/0216577 A1* | 7/2021 | Xiao | G06F 16/3347 |
| 2021/0295822 A1* | 9/2021 | Tomkins | G06F 9/547 |
| 2022/0207343 A1* | 6/2022 | Lei | G06N 3/08 |

OTHER PUBLICATIONS

Alshawi, Hiyan et al., "Logical Forms in the Core Language Engine", 27th Annual Meeting of the Association for Computational Linguistics, https://www.aclweb.org/anthology/P89-1004, Jun. 1989, 8 pages.
Bahdanau, Dzmitry et al., "Neural Machine Translation by Jointly Learning to Align and Translate", Accepted at ICLR 2015 as oral presentation, 2015, 15 pages.
Beer, Kerstin et al., "Training Deep Quantum Neural Networks", Nature Communications (2020) 11:808, https://doi.org/10.1038/s41467-020-14454-2; www.nature.com/naturecommunications, 2020, 6 pages.
Berant, Jonathan et al., "Semantic Parsing on Freebase from Question-Answer Pairs", Stanford University Natural Language Processing; EMNLP, Oct. 20, 2013, 101 pages.
Bollacker, Kurt et al., "Freebase: A Collaboratively Created Graph Database for Structuring Human Knowledge", SIGMOD 2008 / Metaweb Technologies, Inc., Jun. 9-12, 2008, 3 pages.
Bordes, Antoine et al., "Large-Scale Simple Question Answering with Memory Networks", arXiv:1506.02075v1, Jun. 5, 2015, 10 pages.
Bordes, Antoine et al., "Open Question Answering with Weakly Supervised Embedding Models", arXiv:1404.4326v1, Apr. 16, 2014, 16 pages.
Bordes, Antoine et al., "Question Answering with Subgraph Embeddings", Proceedings of the 2014 Conference on Empirical Methods in Natural Language Processing (EMNLP), Doha, Qatar; Association for Computational Linguistics, Oct. 25-29, 2014, 6 pages.
Chardin, Brice et al., "RQL: An SQL-like Query Language for Discovering Meaningful Rules", 2014 IEEE International Conference on Data Mining Workshop, Dec. 14, 2014, 4 pages.
Chen, Yu et al., "Bidirectional Attentive Memory Networks for Question Answering over Knowledge Bases", Accepted as NAACL 2019 Long Paper. Final Version, arXiv:1903.02188v3, Mar. 6, 2019, 11 pages.
Cui, Wanyun et al., "KBQA: Learning Question Answering over QA Corpora and Knowledge Bases", Proceedings of the VLDB Endowment, vol. 10, No. 5, 2017, 12 pages.
Devlin, Jacob et al., "BERT: Pre-training of Deep Bidirectional Transformers for Language Understanding", arXiv:1810.04805v2, Oct. 11, 2018, 16 pages.
Dong, Li et al., "Question Answering over Freebase with Multi-Column Convolutional Neural Networks", Proceedings of the 53rd Annual Meeting of the Association for Computational Linguistics and the 7th International Joint Conference on Natural Language Processing, Beijing, China, Jul. 26-31, 2015, 10 pages.
Fader, Anthony et al., "Identifying Relations for Open Information Extraction", Proceedings of the 2011 Conference on Empirical Methods in Natural Language Processing; Association for Computational Linguistics, Jul. 27-31, 2011, 11 pages.
Fukushima, Kunihiko, "Neural Networks, vol. 1, 1988", NHK Science and Technical Research Laboratories, accepted Sep. 15, 1987, 12 pages.
Graves, Alex et al., "Bidirectional LSTM Networks for Improved Phoneme Classification and Recognition", International Conference on Artificial Neural Networks (ICANN), 2005, 6 pages.
Hao, Xiang et al., "An Attention-Based Neural Network Approach for Single Channel Speech Enhancement", ICASSP 2019-2019 IEEE International Conference on Acoustics, Speech and Signal Processing (ICASSP), 2019, 5 pages.
Hao, Yanchao et al., "An End-to-End Model for Question Answering over Knowledge Base with Cross-Attention Combining Global Knowledge", Proceedings of the 55th Annual Meeting of the Association for Computational Linguistics, Jul. 30-Aug. 4, 2017, 11 pages.
Harris, Zellig S., "Distributional Structure", WORD, 10:2-3, 146-162, DOI: 10:2-3, https://doi.org/1021080/00437956.1954.11659520, Dec. 4, 2015, 18 pages.
Hu, Sen et al., "Answering Natural Language Questions by Subgraph Matching over Knowledge Graphs", 2018 IEEE 34th International Conference on Data Engineering (ICDE), 2018, 15 pages.
Jain, Sarthak, "Question Answering over Knowledge Base using Factual Memory Networks", Proceedings of NAACL-HLT 2016, Association for Computational Linguistics, Jun. 12-17, 2016, 7 pages.
Kim, Yoon, "Convolutional Neural Networks for Sentence Classification", Proceedings of the 2014 Conference on Empirical Methods in Natural Language Processing (EMNLP), Oct. 25-29, 2014, 6 pages.
Kingma, Diederik P. et al., "Adam: A Method for Stochastic Optimization", Published as a conference paper at ICLR 2015, Dec. 22, 2014, 15 pages.
Lehmann, Jens et al., "DBpedia—A Large-scale, Multilingual Knowledge Base Extracted from Wikipedia", Semantic Web 1 (2012) 1-5 IOS Press, 2012, 29 pages.
Luong, Minh-Thang et al., "Effective Approaches to Attention-based Neural Machine Translation", EMNLP 2015, Aug. 17, 2015, 10 pages.
Peters, Matthew E. et al., "Deep contextualized word representations", NAACL 2018, Feb. 15, 2018, 15 pages.
Radford, Alec et al., "Improving Language Understanding by Generative Pre-Training", OpenAI, 2018, 12 pages.
Radford, Alec et al., "Language Models are Unsupervised Multitask Learners", 2018, 24 pages.
Sak, Hasim et al., "Long Short-Term Memory Recurrent Neural Network Architectures for Large Scale Acoustic Modeling", arXiv:1402.1128v1, Feb. 5, 2014, 5 pages.
Seaborne, Andy et al., "SPARQL/Update: A language for updating RDF graphs", SPARQL Update, Jul. 3, 2007, 13 pages.
Seo, Minjoon et al., "Bi-Directional Attention Flow for Machine Comprehension", Published as a conference paper at ICLR 2017, Nov. 5, 2016, 13 pages.
Singhal, Amit, "Introducing the Knowledge Graph: things, not strings", https://blog.google/products/search/introducing-knowledge-graph-things-not, May 16, 2012, 7 pages.
Suchanek, Fabian M. et al., "YAGO: A Core of Semantic Knowledge Unifying WordNet and Wikipedia", WWW 2007 / Track: Semantic Web / Session: Ontologies, May 8-12, 2007, 10 pages.
Sukhbaatar, Sainbayar et al., "End-to-End Memory Networks", Accepted to NIPS 2015, Mar. 31, 2015, 11 pages.
Tablan, Velentin et al., "OLLIE: On-Line Learning for Information Extraction", Proceedings of the HLT-NAACL 2003 Workshop on Software Engineering and Architecture of Language Technology Systems (SEALTS), 2003, 8 pages.
Unger, Christina et al., "An introduction to Question Answering over Linked Data", Reasoning Web 2014, 2014, 41 pages.

(56) References Cited

OTHER PUBLICATIONS

Vaswani, Ashish et al., "Attention Is All You Need", 31st Conference on Neural Information Processing Systems (NIPS 2017) Long Beach, CA, 2017, 15 pages.

Wang, Shuohang et al., "Machine Comprehension Using Match-LSTM and Answer Pointer", Under review as a conference paper at ICLR 2017, arXiv:1608.07905v2, Aug. 29, 2016, 11 pages.

Weston, Jason et al., "Memory Networks", Published as a conference paper at ICLR 2015, arXiv:1410.3916v11, Oct. 15, 2014, 15 pages.

Wolf, Thomas et al., "Transformers: State-of-the-Art Natural Language Processing", Proceedings of the 2020 Conference on Empirical Methods in Natural Language Processing: System Demonstrations, https://www.aclweb.org/anthology/2020.emnlp-demos.6, Oct. 2020, 8 pages.

Wylot, Marcin et al., "RDF Data Storage and Query Processing Schemes: A Survey", ACM Computing Surveys, vol. 51, No. 4, Article 84, Sep. 2018, 37 pages.

Xiong, Caiming et al., "Dynamic Coattention Networks for Question Answering", Published as a conference paper at ICLR 2017, 2017, 14 pages.

Xu, Kun et al., "Hybrid Question Answering over Knowledge Base and Free Text", Proceedings of COLING 2016, the 26th International Conference on Computational Linguistics: Technical Papers, Osaka, Japan, Dec. 11-17, 2016, 11 pages.

Xu, Kun et al., "Question Answering on Freebase via Relation Extraction and Textual Evidence", Proceedings of the 54th Annual Meeting of the Association for Computational Linguistics, Aug. 7-12, 2016, 11 pages.

Yang, Min-Chul et al., "Joint Relational Embeddings for Knowledge-based Question Answering", Proceedings of the 2014 Conference on Empirical Methods in Natural Language Processing (EMNLP), Doha, Qatar, Oct. 25-29, 2014, 6 pages.

Yao, Xuchen et al., "Information Extraction over Structured Data: Question Answering with Freebase", Proceedings of the 52nd Annual Meeting of the Association for Computational Linguistics, Jun. 23-25, 2014, 11 pages.

Yih, Wen-Tau et al., "Semantic Parsing for Single-Relation Question Answering", Proceedings of the 52nd Annual Meeting of the Association for Computational Linguistics, Jun. 23-25, 2014, 6 pages.

Yih, Wen-Tau et al., "Semantic Parsing via Staged Query Graph Generation: Question Answering with Knowledge Base", Proceedings of the 53rd Annual Meeting of the Association for Computational Linguistics and the 7th International Joint Conference on Natural Language Processing, Beijing, China, Jul. 26-31, 2015, 11 pages.

Yih, Wen-Tau et al., "The Value of Semantic Parse Labeling for Knowledge Base Question Answering", Proceedings of the 54th Annual Meeting of the Association for Computational Linguistics; Association for Computational Linguistics, Aug. 7-12, 2016, 6 pages.

Yu, Adams W. et al., "QANet: Combining Local Convolution with Global Self-Attention for Reading Comprehension", Published as a conference paper at ICLR 2018, Apr. 23, 2018, 16 pages.

Zettlemoyer, Luke S. et al., "Learning Context-Dependent Mappings from Sentences to Logical Form", Proceedings of the Joint Conference of the 47th Annual Meeting of the ACL and the 4th International Joint Conference on Natural Language Processing of the AFNLP, Aug. 2009, 9 pages.

Zettlemoyer, Luke S. et al., "Learning to Map Sentences to Logical Form: Structured Classification with Probabilistic Categorial Grammars", Appears in Proceedings of the Twenty-First Conference on Uncertainty in Artificial Intelligence (UAI2005), Jul. 4, 2012, 9 pages.

Zhu, Qiannan et al., "DAN: Deep Attention Neural Network for News Recommendation", The 33rd AAAI Conference on Artificial Intelligence (AAAI-19), 2019, 8 pages.

\* cited by examiner

FIG. 2E

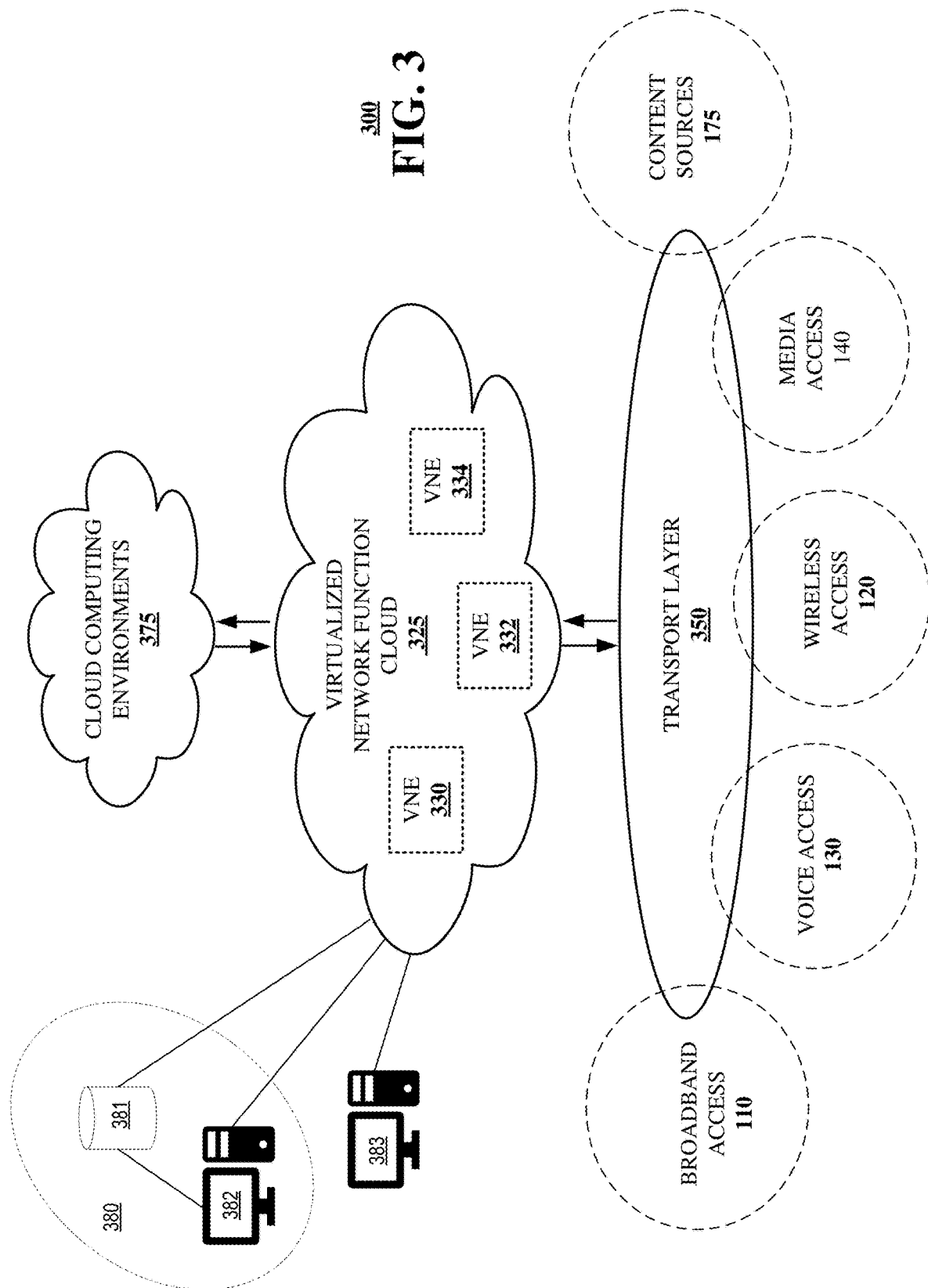

SYSTEM AND METHOD FOR HYBRID QUESTION ANSWERING OVER KNOWLEDGE GRAPH

FIELD OF THE DISCLOSURE

The subject disclosure relates to system and method for hybrid question answering over knowledge graph.

BACKGROUND

Question answering (QA) systems enable natural language platforms to interact with Knowledge Bases. These QA systems return direct and more specific answers to asked questions. In recent years, there has been an increase in popularity and usage of knowledge bases (KB), such as the Google® Knowledge Graph. The Knowledge Graph supports searches for things, people or places that Google® knows about, such as landmarks, celebrities, cities, sports teams, buildings, geographical features, movies, celestial objects, works of art and more. Other knowledge bases include, without limitation, YAGO (Yet Another Great Ontology), an open-source knowledge base developed at the Max Plank Institute, the DBPedia KB, which extracts structured content from the information created in the Wikipedia® project, and Metaweb's Freebase KB, a collaborative knowledge base consisting of data harvested from many sources and composed mainly by members. It is common for knowledge bases to adopt a resource description framework as a data format. It is quite common for such knowledge bases to contain very large numbers, e.g., billions, of entries that may be stored in triples referring to a related subject, predicate and object.

Information may be obtained from such large knowledge bases by queries directed to the knowledge base. There are several languages specifically adapted for querying such large knowledge bases, such as SPARQL, a semantic query language for databases adapted to retrieve and manipulate data stored in resource description framework (RDF) format, Xcerpt and RQL, an RDF query language. Such query languages generally impose a syntax, semantics, and an ontology of the knowledge base, and require some degree of skill and/or training.

By contrast, knowledge-based QA systems may accept natural language as a query, offering a more user-friendly solution. There are two primary approaches for the task of QA: (i) semantic parsing based systems (SP-based), and (ii) information retrieval-based systems (IR-based). The SP-based approaches address the QA problem by constructing a semantic parser that converts a natural language question into a conditionally structured expressions, like the logical forms, and then run the query on the knowledge base to obtain the answer. The SP-based approaches generally convert candidate entity-predicate pairs into a query statement and query the knowledge base to obtain an answer. Example SP-based systems may include three modules: (i) an entity linking module, adapted to recognizes all entity mentions in a question and link each mention to an entity in the knowledge base; (ii) a predicate mapping module adapted to find candidate predicates for the question within the knowledge base; and (iii) an answer selection module. IR-based approaches are generally more flexible and require less supervision compared with the SP-based approaches.

BRIEF DESCRIPTION OF THE DRAWINGS

Reference will now be made to the accompanying drawings, which are not necessarily drawn to scale, and wherein:

FIG. 2E is a schematic diagram illustrating an example of attention weights determined according to a natural language, question, and answer system functioning within the communication network of FIG. 2D in accordance with various aspects described herein.

FIG. 3 is a block diagram illustrating an example, non-limiting embodiment of a virtualized communication network in accordance with various aspects described herein.

DETAILED DESCRIPTION

Figure 1:
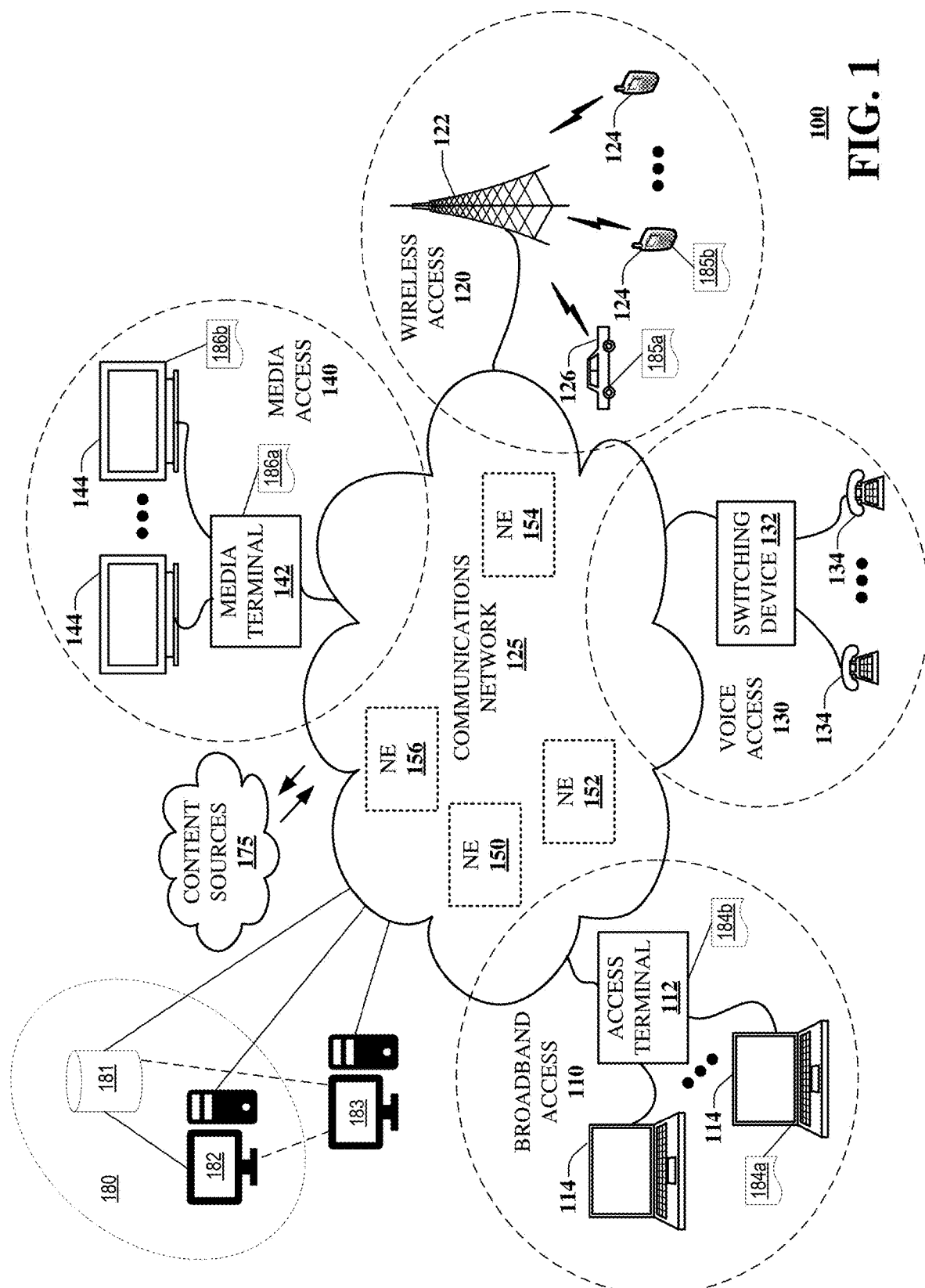
FIG. 1 is a block diagram illustrating an exemplary, non-limiting embodiment of a communications network in accordance with various aspects described herein.

The subject disclosure describes, among other things, illustrative embodiments for answering natural language questions over a knowledge graph using a knowledge-embedding based a question-answering framework. In at least some embodiments, a bidirectional encoder representations from transformer (BERT) incorporates pre-trained language model embeddings to encode a question and candidate answer contexts from a knowledge base. The BERT may be pretrained in a general manner that is not necessarily directed to any particular task and then, subsequently fine-tuned for a question answer (QA) task, using a multi-head attention mechanism that may be based on a convolution neural network encoder. At least some of the example architectures disclosed herein are based on a bi-directional, cross attention mechanism between an encoded representation of the asked question and an encoded representation of answer contexts obtained from the knowledge base. Other embodiments are described in the subject disclosure.

One or more aspects of the subject disclosure include a process that receives, by a processing system including a processor, a natural language question, identifies without human intervention, a topic entity of the natural language question and locates, within a knowledge graph, a focal node corresponding to the topic entity. A candidate answer set is gathered within the knowledge graph that includes a group of other entities. The other entities are gathered according to a predetermined proximity to the focal node, and contextual information for the group of other entities of the candidate answer set is generated from the knowledge graph. The natural language question and the contextual information of the group of other entities of the candidate answer set are separately encoded to obtain an encoded vectorial representation of the natural language question and a plurality of encoded vectorial representations of the candidate answer set. The encoding uses pre-trained language model embeddings obtained via a pre-trained bidirectional encoder representations from transformer (BERT) encoder. The encoded vectorial representation of the natural language questions is evaluated under an influence of a plurality of aspects of the contextual information to obtain a plurality of score values. A member of the candidate answer set is selected according to the plurality of score values to obtain a selected one of the candidate answer set as an answer to the natural language question.

One or more aspects of the subject disclosure include a device including a processing system including a processor and a memory that stores executable. The executable instructions, when executed by the processing system, facilitate performance of operations that include identifying, without human intervention, a main entity of a natural language question, locating, within a knowledge graph, a focal node corresponding to the main entity, and identifying, within the knowledge graph, a candidate answer set including a group of other entities within a predetermined proximity of the focal node. Contextual information for the group of other entities of the candidate answer set is extracted from the knowledge graph. The natural language question and the contextual information of the group of other entities of the candidate answer set are separately encoded to obtain an encoded vectorial representation of the natural language question and a plurality of encoded vectorial representations of the candidate answer set. The encoding uses pre-trained language model embeddings obtained via a bidirectional encoder representations from transformer (BERT) encoding process. The encoded vectorial representation of the natural language question under an influence of a plurality of aspects of the contextual information are scored to obtain score values, and a member of the candidate answer set is selected according to the score values to obtain a selected one of the candidate answer set as an answer to the natural language question.

One or more aspects of the subject disclosure include a non-transitory, machine-readable medium, comprising executable instructions that, when executed by a processing system including a processor, facilitate performance of operations. The operations include identifying an entity of a natural language question, locating, within a knowledge graph, a node corresponding to the entity, and generating a candidate answer set including a group of other entities located a predetermined proximity to the node within the knowledge graph. Contextual information for the group of other entities of the candidate answer set is determined from the knowledge graph, and the natural language question and the contextual information of the group of other entities of the candidate answer set are encoded separately to obtain an encoded vectorial representation of the natural language question and an encoded vectorial representation of the candidate answer set, wherein the encoding uses pre-trained language model embeddings obtained via a bidirectional encoder representations from transformer (BERT) encoding process. The encoded vectorial representation of the natural language question under an influence of a plurality of aspects of the contextual information are scored to obtain score values and a member of the candidate answer set is selected according to the score values to obtain a selected one of the candidate answer set as an answer to the natural language question.

An IR-based approach may focus on mapping answers and questions into a common embedding space, where one could query any knowledge base, independent of its schema without requiring any grammar or lexicon. In the field of knowledge base question answer (KB-QA), under IR-based umbrella, embedding-based approaches have been proposed. However, these approaches face at least two limitations. First, these models encode different components separately without learning the representation of the whole KB. Hence, they are not able to capture the compositional semantics in a global perspective. Second, the performance of Long-Short-Term Memory (LSTM)s, Bi-directional LSTM (BiLSTM)s, and Convolutional Neural Network (CNN)s used in traditional UR-based solutions are heavily dependent on large training data sets which is often not available in practice. In recent years, language models pre-trained on large-scale unsupervised corpus have shown advantages on mining prior linguistic knowledge automatically, it indicates a possible way to deal with above problems.

In at least some embodiments, a pre-trained language model may be applied to an IR-based, knowledge base QA task. For example, pre-trained language model includes embeddings obtained using a bidirectional encoder representations from transformers (BERT). The embeddings may facilitate encoding of a question and any candidate answer contexts. In at least some embodiments, the encoder may include a multi-head attention encoder. The multi-head attention encoder may be based on a convolution neural network (CNN) encoder to fine tune BERT pre-trained embeddings in particular for the KB-QA task.

The language model may be trained on an appropriate corpus, e.g., based on a language of the operator and/or a language of the question. For example, an English language model may be trained on the English Wikipedia and/or some other suitable collection of English text samples. By way of example, the English language model may be trained using the Brown University Standard Corpus of Present-Day American English, the "Brown Corpus," which includes an electronic collection of text samples of American English by using such expansive training material for question and knowledge base representations, an undesirable out-of-vocabulary problem may be avoided.

Interrelationships between questions and underlying knowledge base may be stored as a context for the knowledge base QA approach. This context may be used to filter out context, e.g., candidate answers, by implementing cross-attention between a question being asked and the knowledge base.

At least one example approach is referred to herein as a language-model-based knowledge base QA (LM-KBQA) approach. The LM-KBQA approach exploits BERT pre-trained language model embeddings to capture contextual representations. Beneficially, the BERT pre-trained language model embeddings eliminate any need for Recurrent Neural Network (RNN) architectures, such as long-term-short-term memory (LSTM) and/or bidirectional LSTM, which would impose a much greater burden on any underlying KB-QA processing system. In more detail, the LM-KBQA approach may utilize one or more CNN encoders. The CNN encoder(s) may include a self multi-head attention mechanism adapted to fine-tune the BERT embedding for the KB-QA task. Experimental results of this approach have demonstrated its effectiveness according to an open web-questions data-set.

Referring now to FIG. 1, a block diagram is shown illustrating an example, non-limiting embodiment of a system 100 in accordance with various aspects described herein. For example, the system 100 can facilitate, in whole or in part, a question answering task over a knowledge base using language model embeddings. In operation, the system 100 receives a natural language question, identifies a primary entity for the question and gathers other entities, such as all other entities that are directly associated to the primary entity, and possibly other entities related to the primary entity within some number of hops, e.g., two hops, within the graph. The number of hops may refer to a number of knowledge graph edges traversed between the primary entity and another entity of the knowledge graph, e.g., a path.

A candidate answer set may be generated according to at least some of the other entities. The candidate answer set may include a name of the entity, and one or more other aspects of the candidate answer, such as an answer type, an answer path and/or an answer context, which are discussed more fully below. The questions may be encoded using a pre-trained neural network, such as a bidirectional encoder representations from transformers (BERT) model. The neural network may include a convolutional neural network (CNN) encoder with multi-head attention adapted for relationship understanding, which may be pre-trained according to a particular language, e.g., English, and fine-tuned to adapt the CNN to a specific task, such as a question answering task. In at least some embodiments, the system 100 may include one or more cross-attention neural networks adapted to represent a question under the influence of candidate answer set aspects, such as entity type and/or relation paths. The system 100 may be further adapted to determine an answer to the question, e.g., by comparing results of responses of the cross-attention neural networks to the question under the influence of the candidate answer set aspects. For example, the system 100 may calculate a respective similarity score between the question and each corresponding candidate answer set and select a final answer or answers according to the scores.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets, or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway, or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In more detail, the example system 100 includes a storage device 181 adapted to store knowledge base information, e.g., in the form of a knowledge graph. The stored knowledge graph may conform to a data structure that represents a number of interconnected nodes, with pairs of nodes of the graph being interconnected by edges of the graph. For example, the nodes may represent named entities, such as persons, places and/or things. An edge may represent a relationship between a pair of the interconnected nodes or entities. The storage device 181 may be part of a knowledge base management system 180 that includes the storage device 181 and at least one knowledge base (KB) controller, e.g., a KB server 182 adapted to access, maintain and/or otherwise modify the knowledge graph.

The example system 100 further includes a question-answer system adapted to determine answers to natural language questions from information maintained by the knowledge base management system 180. For example, the system 100 may include a question answer (QA) server 183 hosting a back-end question-answer service. The QA server 183 receives a query via the communication network 125, processes the query and generates an answer according to information maintained by the knowledge base management system. In some embodiments, the QA server 183 is collocated with the storage device 181. For example, functionality of the QA server 183 and the KB server 182 may be hosted within a common server. Alternatively or in addition, the storage device 181 may be independently accessible via a separate controller, such as an independent server 182, via the communications network 125.

More generally, one or more of the KB server 182, the storage device 181 and/or the QA server 183 may be in communication with the communications network 125 and otherwise accessible via one or more of the broadband access 110 mode, the voice access 130 mode, the wireless access 120 mode and/or the media access 140 mode. For example, one or more of the storage device 181, the KB management system 180 and/or the QA server may be accessible via broadband access 110 mode by one or more of a computing device 114, such as a personal computer, a laptop computer, a tablet device, or any smart device, such as a smart television and the like. In at least some embodiments, one or more of the computing device 114 or the broadband access terminal 112 may be configured with functionality 184a, 184b, e.g., a client program, an app, or the like, adapted to interact with the knowledge graph. Alternatively or in addition the functionality 184a, 184b may be adapted to interact with the QA server 183. Accordingly, a knowledge graph may be accessed, reviewed, and/or modified locally via the KB server 182, and/or remotely via one or more of the computing device or the broadband access terminal 112. Similarly, QA functionality of the back-end QA service may be accessed locally, via the QA server 183 and/or remotely via one or more of the computing device or the broadband access terminal 112.

Likewise, one or more mobile devices 124, 126, such as a smart phone, a personal computer, a laptop computer, a tablet device, a smart watch, or any smart device, may be configured with similar functionality 185a, 185b adapted to interact with one or more of the KB storage device 181, the KB management system 180 and/or the QA server 183. The functionality 185a, 185b may be provide via a client program, an app, or the like. The client program and/or app may include a user interface presenting selectable options, such as question domains, knowledge graphs, and the like. One or more of the storage device 181, the KB management system 180 and/or the QA server 183 may be accessible via the media access 140 by utilizing the display devices 144, such as a smart television. In at least some embodiments, one or more of the smart display devices 144 or the media access terminal 142 may be configured with knowledge base functionality 186a, 186b, e.g., a client program, an app, or the like, adapted to facilitate KB and/or QA resources or services.

It is conceivable that in at least some instances, one or more of the storage device 181, the KB management system 180 and/or the QA server 183 may be accessible via voice access, e.g., 130 utilizing one or more of telephony devices 134, such as a traditional landline telephone instrument, teleconferencing systems, and/or a videoconferencing systems. For example, one or more of the storage device 181, the KB management system 180 and/or the QA server 183 may be configured with a voice activated control system, e.g., via spoken commands and/or responses and/or via DTMF signaling. In such applications, a user may speak a natural language question to the QA server 134 via the telephone device 134. The QA server 183 may process the query to determine an answer and forward the answer to the user via one or more of a voice response via the telephone device 134 and/or via some other mode, such as an email or test message. The answer may be converted from text to voice at the QA server 183, within the communications network 125 for delivery to the user via the voice access 130.

Figure 2A:
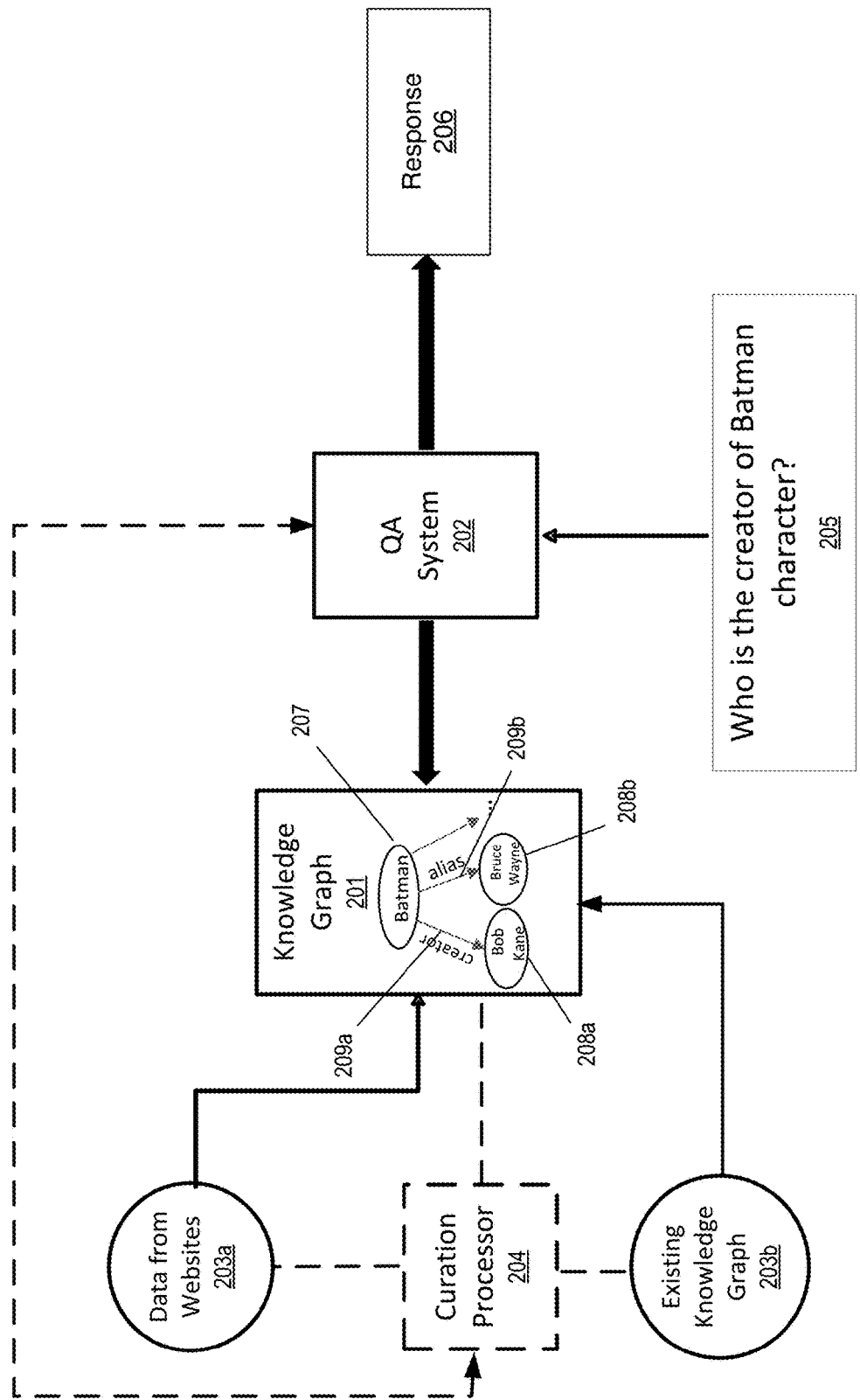
FIG. 2A is a block diagram illustrating an example, non-limiting embodiment of a natural language, question and answer system functioning within the communication network of FIG. 1 in accordance with various aspects described herein.

FIG. 2A is a block diagram illustrating an example, non-limiting embodiment of a natural language, question-answer (QA) system 200 functioning within the communication network of FIG. 1, in accordance with various aspects described herein. The QA system 200 includes a knowledge base according to a data structure. The example data structure includes a knowledge graph 201 having a collection of interconnected nodes 207, 208a, 208b. Generally, each node 207, 208a, 208b represents a named entity, as in a person, place, or thing. By way of example, a first node 207 may be connected to one or more other nodes 208a, 208b, generally 208, of the knowledge graph via respective edges 209a, 209b, generally 209. An edge 209 may correspond to a relationship between the interconnected pair of nodes. In at least some configurations, the edge 209 include a directional aspect. For example, a first node 207 represents the entity, such as the name of a fictional cartoon character. Another node 208a represents the entity "John Doe" with relationship of "created by" directed from the fictional character to John Doe. Read in context, the pair of nodes 207, 208a, interconnected by the first relationship edge 209a stores the information "fictional character created by John Doe," or conversely, "John Doe is a creator of the fictional character." Similarly, another node 208b represents the entity "character's alias name" with relationship of "alias" directed from the fictional character to the character's alias name. Read in context, the pair of nodes 207, 208b, interconnected by the second relationship edge 209b stores the information "fictional character alias character's alias name," or conversely, "character's alias name is an alias for the fictional character."

The example QA system 200 may include a QA processing module 202 in communication with the knowledge graph 201. The QA processing module 202 is configured to accept a natural language question and to determine an answer set from information stored within the knowledge graph 201. According to the illustrative example, the QA processing module 202 may receive the natural language question "who is the creator of Batman character." As described more fully elsewhere herein, the QA processing module 202 encodes the original question, obtains a candidate answer set from the knowledge graph 201 and processes the encoded question under the influence of encoded representations of the candidate answer set. The QA processing module 202 uses a scoring process to score processed results of the encoded question under the influence of each answer of the candidate answer set. The QA processing module 202 evaluates the scores, e.g., according to a ranking and/or according to a score threshold to distinguish one or more answers from the candidate answer set. For example, the QA processing module 202 may determine independent scores for the original question under the influence of the first interconnected node 208a and the second interconnected node 208b and conclude from a comparison of the scores that the first node 208a, i.e., the entity "Bob Kane" is a suitable answer. The response 206 may be presented as a textual output. Alternatively or in addition, the response 206 may be presented as an image, e.g., a photograph and/or a graphic. In at least some embodiments, the response 206 may include audio, e.g., using a text-to-speech converter and/or a video, e.g., a short video clip or a thumbnail that links to a short video clip representative of the answer(s).

The QA system 200 may provide a response 206 in the form of an answer, e.g., "Bob Kane" or "Bob Kane is the creator of Batman." In some embodiments, the response may be provided with supplemental information. For example, the answer may include a confidence measure, e.g., "definitely" or "most likely" or "possibly," e.g., depending upon results of the scoring process. It is anticipated that there may be more than one answer, in which instances the response may include multiple answers, e.g., in a form of a list. In at least some embodiments, multiple answers of such responses may be presented as a rank ordered list, e.g., according to their respective scores.

The QA processing module 202 may be implemented according to an app that accesses a back end server and/or service. Alternatively or in addition, the QA processing module 202 may be implemented according to a client-server model, in which a client QA processing module 202 may be hosted on a user device, such as a mobile phone, a tablet device, a smart television, a personal computer and the like. The QA processing module 202 may be adapted to receive a question, e.g., posed by a user. Without limitation, the question may take the form of one or more of a textual input, e.g., typed at a user interface, a selection from a menu and/or a selectable icon of the user interface, or spoken. A spoken question may be converted to text, e.g., using a text-to-speech application, before being posed to the QA processing module 202. Alternatively or in addition, text-to-speech functionality may be included within the QA processing module 202.

The knowledge graph 201 may be a separately maintained knowledge graph, such as the Google® Knowledge Graph, YAGO, DBPedia, and Freebase. Alternatively or in addition, the knowledge graph 201 may be a curated knowledge graph according to a particular domain. For example, the domain may include information related to the fictional comic character web sites and/or information available there and perhaps elsewhere related to the fictional comic. For example, the DC Comics® database, is a searchable web resource that anyone can edit, which contains information related to DC Comics fictional characters, such as superheroes, e.g., Superman or Batman and the like. In some embodiments, the knowledge graph 201 may incorporate information from one or more other sources, such as data from websites 203a, e.g., DC Comics® information network, web sites and/or data from another existing knowledge graph 203b, e.g., the Google® Knowledge Graph, YAGO, DBPedia, and Freebase.

Curation of the knowledge graph 201 may be performed manually and/or according to an automated process. For example, the QA system 200 may include a knowledge-graph curation processor 204 (shown in phantom). The knowledge-graph curation processor 204 may be in communication with the knowledge graph 201 and one or more of the other websites, to access data from the other websites 203a for evaluation and possible incorporation into the knowledge graph 201. Likewise, the knowledge-graph curation processor 204 may be in communication with the knowledge graph 201 and one or more of the other knowledge bases, to access data from the other knowledge graphs 203b for evaluation and possible incorporation into the knowledge graph 201.

In at least some embodiments, the knowledge-graph curation processor 204 uses bots to crawl one or more of the other websites and other knowledge graphs to obtain information therefrom related to a particular domain or domains of the knowledge graph 201. When information is discovered by the bots, the knowledge-graph curation processor 204 may determine whether the information is already included within the knowledge graph. If domain-related information is discovered that is not already included in the knowledge graph, the curation processor 204 may cooperate with the knowledge graph to create one or more new nodes, i.e., entities, as may be required, and/or to add one or more edges, i.e., relationships, as may be required, and/or to incorporate any other information as may be relevant to aspects of a candidate answer directed to the entity, within the relevant domain(s).

In at least some embodiments, the knowledge-graph curation processor 204 is in communication with the QA system 202. For example, the QA system 202 may receive a natural language question 205, identify one or more entities identified therein, and access the knowledge graph 201 to generate candidate answers related to the entities. It is envisioned that in at least some instances, the knowledge graph 201 may not include an entity and/or a predetermined sufficient number of proximate entities within a predetermined number of hops, i.e., edges, from the entity. Responsive to such situations, the curation processor 204 may be adapted to query one or more of the other websites 203a or the existing knowledge graphs 203b to identify information related to the entity. Identified information may be incorporated into the knowledge graph 201 to obtain an updated knowledge graph, better adapted to respond to the original question.

Figure 2B:
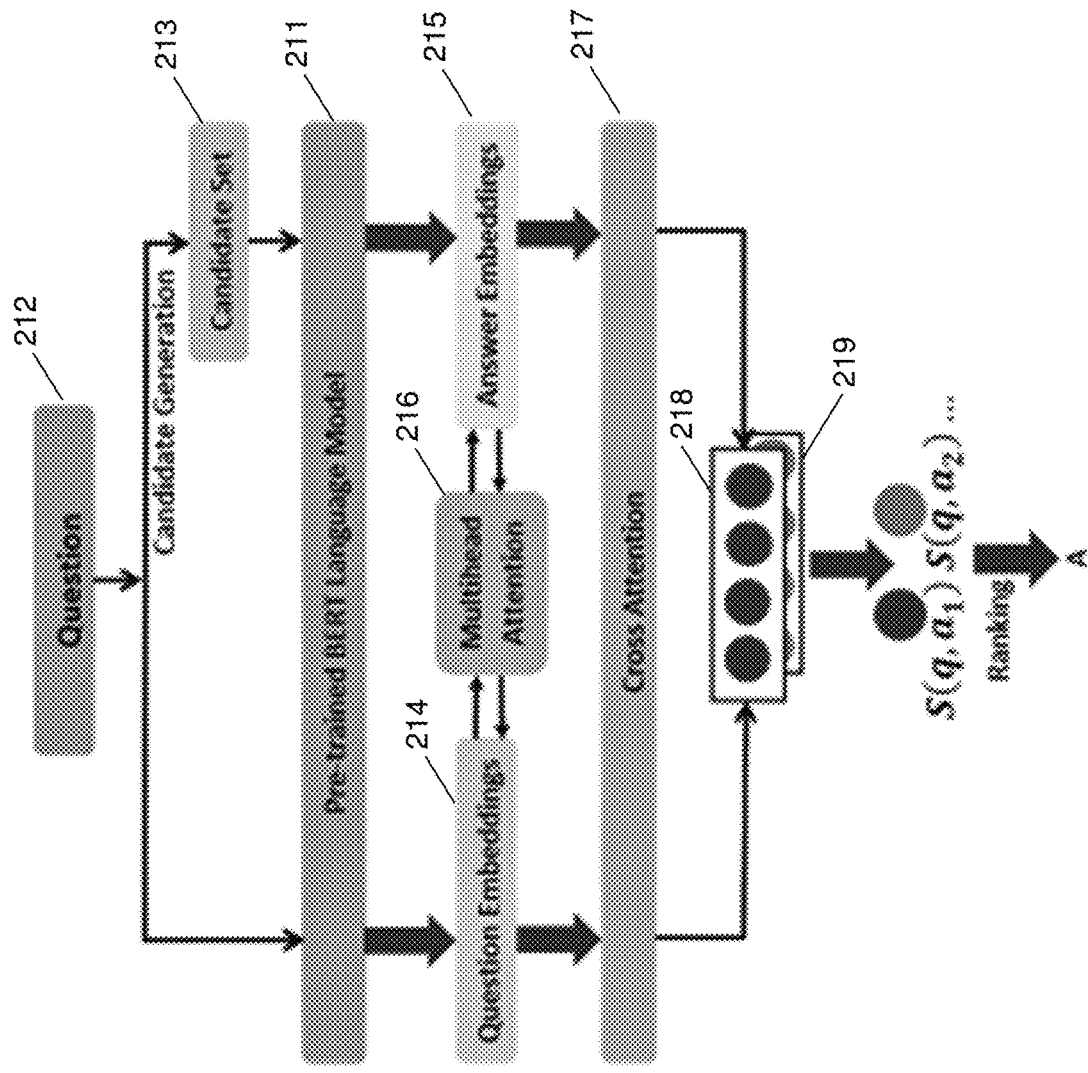
FIG. 2B is a more detailed block diagram illustrating an example, non-limiting embodiment of a natural language, question and answer system functioning within the system of FIG. 2A in accordance with various aspects described herein.

FIG. 2B is a more detailed block diagram illustrating an example, non-limiting embodiment of a natural language, knowledge base question-answer (KB-QA) system 210 implementing a KB-QA task functioning within the system 200 of FIG. 2A in accordance with various aspects described herein. The goal of a KB-QA task can be formalized as follows: given a natural language question "q", the model should return an entity set "A" as answers. First, the candidate entity of the question is identified, then the candidate answers are generated from an available knowledge base, such as Freebase and/or from a curated, domain specific knowledge base, such as the DC Comics® knowledge base.

The KB-QA system 210 may include a question module 212 adapted to receive a natural language question. The question module 212 may be in communication with a candidate set module 213 that may be adapted to generate a candidate set of answers responsive to a natural language question received via the question module 212. For example, the candidate set module 213 may be adapted to identify named entities within the natural language question. The candidate set module 213 may be further adapted to query a knowledge base, such as the example knowledge graph 201 (FIG. 2A), to obtain information related to the identified entities. Information may include one or more of an answer type, an answer path, and an answer context. Answer type may include, without limitation, an indication of the type of entity, e.g., is it person, a place, or a thing. Such information may be relevant to evaluate attention to questions as to who, where and/or what. Answer path may include, without location, a path between a primary entity of the question and entities associated with one or more candidate answers as determined from the knowledge graph 201.

Candidate answers may be identified according to their proximity within the knowledge graph to a primary entity of the question as represented within the knowledge graph. A proximity may be predetermined, e.g., according to a number of paths or graph edges between the primary entity and the candidate answer. For example, a proximity may be predetermined as two-hops, such that all entities directly connected to the primary entity or connected to entities that are directly connected to the primary entity, will be selected, extracted and/or otherwise identified as candidate answers. It is envisioned that in some embodiments, a fixed proximity value may be established for all questions serviced by the KB-QA system 210. Alternatively or in addition, different fixed proximity requirements may be established according to one or more predetermined rules. For example, a rule-based proximity value may be determined according to one or more of an entity type, a question length, a user identity, a subscription level, processing and/or network conditions, such as processing and/or network capacity, load conditions.

In at least some embodiments, a rule-based proximity value may be adapted and/or otherwise modified according to a candidate answer set. For example, a number of candidate answers returned from a first proximity value, e.g., 2-hop, may be increased, e.g., to 3-hop, if a number of candidate answers returned according to the first proximity value fails to satisfy a candidate answer set threshold value. It is understood that the proximity value may be increased and/or decreased according to the threshold value.

In at least some embodiments, more than one candidate answer sets may be obtained, e.g., according to different proximity values, with each of the candidate answer sets independently processed according to the techniques disclosed herein. A post-processing lay may be applied to separate results, e.g., to compare the separately obtained answer results, e.g., to identify a confidence measure. For example, a greater confidence value may be determined for situations in which the independently obtained results agree. Alternatively, a lesser confidence value may be determined when the results do not agree. The post processing layer may apply other rules to determine an answer and/or commentary upon the answer according to the rules. For example, an answer obtained with a lesser or greater proximity value may be identified as a preferred answer when there is disagreement.

The example KB-QA system 210 includes a BERT language model processor 211 adapted to encode a natural language question received by the question module 212. The BERT language model processor may be pre-trained, e.g., in a general sense, without regard to any particular task, and subsequently fine-tuned according to the QA task. In at least some embodiments, the BERT language model processor 211 is fine-tuned according to a CNN encoder 216 employing multi-head attention for relationship understanding. According to the multi-head attention feature of the CNN encoder 216, the answer embeddings 215 may evaluate one or more different aspects of each of the candidate answers. The question encoding obtained via the BERT language model processor 211 are stored in a question embedding matrix 214. Similarly, the BERT language model processor 211 is adapted to separately encode information of the candidate answer set and store the results according to answer embedding matrixes 215, e.g., a different answer embedding matrix for each answer of the candidate set of answers.

The KB-QA system 210 also includes a cross-attention neural network 217 adapted to represent the encoded question from the question embedding 214 under the influence of the encoded candidate answer set aspects of the answer embeddings 215, e.g., entity types, relation paths, and vice versa. The embedding matrices of the questions 214 and the candidate answers 215 are processed to evaluation cross-attention between the question and each of the different aspects of each of the candidate answers. Cross-attention results obtained according to different aspects of a first answer of the candidate answers may be combined, e.g., summed, to obtain a single, first cross-attention result 218 for the first candidate answer. Likewise, cross-attention results obtained according to different aspects of a second answer of the candidate answers may be combined, e.g., summed, to obtain a single, second cross-attention result 219 for the first candidate answer question and different aspects of the candidate answers.

The KB-QA system 210 can be configured with a scoring module adapted to obtain a similarity score value. The similarity score value may be indicative of a measure of similarity according to the cross-attention module for a particular answer of the candidate answer set. For example, the scoring module may calculate a first similarity score for the first cross-attention result 218 and a second similarity score for the second cross-attention result 219. The similarity score between the question and each corresponding candidate answer set is calculated, and the candidates with the highest score will be selected as the final answer.

In at least some embodiments, the KB-QA system 210 includes a ranking module. Then ranking module may be adapted to compare cross-attention results determined for the candidate answers. For example, the ranking module may compare similarity scores determined for each answer to a threshold. If the similarity score is above a score threshold, the candidate answer may be selected as an answer to the question. It is envisioned that in at least some embodiments, more than one answer may be selected based on a threshold comparison. Alternatively or in addition, the ranking module may perform a ranking of the cross-attention results based upon their corresponding similarity score values. For example, an answer and/or answers to the question may be determined according to the ranking. In some embodiments, select of the answer may be determined according to a comparison of scores to a threshold and a ranking.

Freebase presents an example knowledge base, having more than 3 billion facts, which makes it well-suited for supporting a knowledge base QA application. Within Freebase, facts are represented as subject-predicate-object triples (s, p, o). Below is an example triple in Freebase:

(/m/01428, /language/human_language/countries_spoken_in, /m/03_r3). This triple relates to a fact that a language spoken in a country of Jamaica is Jamaican English, where "/m/03_T3" denotes a country Jamaica, while "/m101428" denotes a language Jamaican English, and "/language/human_language/countries_spoken_in" denotes a relationship between the Freebase entities.

In some embodiments, all entities in the Freebase knowledge base may be considered as candidate answers, but practically, this would be computationally expensive. The process may be simplified by obtaining a subset of all available triples. The subset may be selected based on a higher likelihood as candidate answers. For example, the Freebase API may be used to find a named entity for each question "q", which may function as a primary entity for the given question. For general understanding, Freebase API methodology resolved 86% of questions in open Web-Questions data-set when a top-1 accuracy criteria is used.

For example if the question "what language Jamaican people speak?" is passed through the Freebase API, it returns "Jamaica" as the main entity. After the named entity is identified with Freebase API, we gather all the other entities that are directly associated to the named entity within 2-hops. These entities create the candidate set.

Continuing with the illustrative example, representations for each word in the question may be collected. These representations contain all the information of the question, and could serve as follows: for example, the question Q may be represented as $Q=(x_1, x_2, \ldots, x_n)$ where "$x_i$" stands for $i^{th}$ word. The input natural language question $Q=\{q_i\}_{i=1}^{|Q|}$ as a sequence of word embeddings "$q_i$" fine-tuned from the BERT pre-trained language model using an encoder layer. For each candidate set from the KB, a context is generated for each question. By way of example, and without limitation, the generated context may focus on three aspects: answer type, answer path, and answer context from KB. Answer type contains entity type information and helps in narrowing down entities while ranking the answers. If a question uses the word "who", the candidate answers that are relevant to a person are more likely to be correct. Answer path is a sequence of relations from a candidate set to a named entity. For example "/language/human_language/countries_spoken_in" is a relation path between Jamaica and Jamaican English which is stored as [human, language, countries, spoken, in] in the Freebase knowledge base.

Answer context may be defined as surrounding entities (e.g., neighboring nodes of the primary entity within the knowledge graph) of the candidate answer, which help to answer the asked questions with constraints. In at least some embodiments, only those context nodes have overlap with the asked question are considered. For example, for each context node, e.g., a sequence of words, of a candidate, the longest common sub-sequence between the neighbors and the question is computed first. If there exists some common sub-sequence between question and neighbor entities, they may be stored as answer context, which may facilitate answering questions with multiple entities. All this information may be stored as the context and may be fed into the pre-trained BERT model 211 to generate embeddings that may be fine-tuned using an encoder layer.

The BERT model 211 is a multi-layer bidirectional transformer encoder. The given input may be a token sequence at the character-level. This means it is either a single sequence or a special token [SEP] separated sentence pair. Each token in the input sequences is the aggregate of the token embeddings, the segment embeddings, and the position embeddings. The initial token in every sequence is consistently a special classification symbol ([CLS]), and for the classification tasks it uses the hidden state of the token. After fine tuning, the pre-trained BERT representations are used in several natural language processing tasks.

For an input sequence of word or sub-word tokens $X=(x_1, \ldots, x_n)$, the BERT model 211 trains an encoder that generates a contextualized representations for each token: $x_1, \ldots, x_n = enc(x_1, \ldots, x_n)$. Each token in the sequence, positional embeddings $p_1, \ldots, p_n$ may be used to label an absolute position within an input sequence, because a deep transformer may be used to implement the encoder.

A masked language modeling (MLM) or "Cloze test", may be used to predict the missing tokens from their placeholders in a given sequence, when a subset of tokens $Y \subseteq X$ is sampled and substituted with placeholder set of tokens. In a BERT MLM implementation, the value Y may account for some percentage, e.g., 15%, of the tokens in X. Of those, another percentage, e.g., 80%, may be replaced with a [MASK], and another percentage, e.g., 10%, replaced with a random token, e.g., according to a unigram distribution, while another 10% may be kept unchanged. A goal of this approach is to predict a modified input from the original tokens in Y. BERT selects each token in Y independently by randomly selecting a subset.

Next Sentence Prediction (NSP) represents a different task to which a pre-trained BER language model may be used. NSP predicts whether a word sequence $X_B$ is an immediate continuation of another word sequence $X_A$ when the two sequences $X_A$ and $X_B$ are given as input. According to a BERT methodology, the first word sequence $X_A$ is taken form from a corpus. The second word sequence $X_B$ may be read from the corpus, from a point at which the first word sequence $X_A$ has terminated. Alternatively, the second word sequency $X_B$ may be randomly sampled from a different point within corpus. A special token [SEP] may be used to separate the two sequences, while another special token [CLS] may be appended to each of $X_A$ and $X_B$ to express as an input. The [CLS] may be used to truly find whether $X_B$ follows $X_A$ in the corpus.

To embed question and knowledge graph context, a pre-trained BERT language model may be used. Without a need of a recurrent architecture, BERT uses positional embeddings to encode the word sequences. By using unsupervised learning based on masked language models (MLM) and Next Sentence Prediction (NSP), BERT embeddings are generated. These embeddings contain bidirectional attention from MLM section of BERT.

BERT model takes sentences in one or two formats. If we have a context of [location, language, human, language, countries, spoken, in, Jamaican] and a question [what does Jamaican people speak?], we can either encode it as a single input or two separate inputs to the BERT Model as shown below:

<CLS>[question]<SEP>[context] Or
<CLS>[question]
<CLS>[context]

The techniques disclosed herein provide the context and query together, with the query being presented first followed by the context. For a BERT module trained on a "next sentence prediction" outcome, the query followed by context formulation may promote richer query and context embeddings. According to an illustrative example, a maximum length of a context and a question are 96 and 18, respectively. A concatenation of all layers of the BERT model, e.g., 12 layers, may be used as an embedding layer.

An encoder layer may be arranged according to a stack of following layers: [CNN-layer+self-attention-layer+feed-forward-layer]. Similarly, an input of the encoder layer at each position may be represented as [c, a, c⊙a, c⊙b], where a and b are respectively a row of attention matrixes A and B. For the self-attention layer, the multi-head attention mechanism is adapted as follows to improve a basic attention mechanism.

$$head_i = \text{Attention}(QW^Q_i, KW^K_i, VW^V_i) \quad (1)$$

$$\text{Multi-Head}(Q, K, V) = \text{Concat}(head1, \ldots, headh) \quad (2)$$

$$\text{SelfMulti-Head} = \text{Multi-head}(X, X, X) \quad (3)$$

These three equations correspond to a formation process of the self multi-head attention mechanism. The matrix of W is a weight matrix. The Q, V, K represent query, value, key vectors, that each multiplies its corresponding weight matrix before getting into the attention function. Repeat this process h times, according to the number of heads, h. Each of the results may be connected to obtain a new vector matrix that reflects a relationship between the query and value vectors Q and V. In particular, the self multi-head attention mechanism, is adapted to expose internal connections within words, with Q=V=K=X, with X representing the word vector matrix.

The multi-head attention mechanism helps the model learn the words relevant information in different presentation sub-spaces. The self-attention mechanism can extract the dependence in words. As the name shows, the self multi-head attention mechanism integrates the benefits of both, creates a context vector for each word. Then we do not need to depend on additional information to get a matrix that reflects the context relationship between current word and other words in a sequence. Each of these basic operations (cnn/self-attention/ffn) is placed inside a residual block.

Figure 2C:
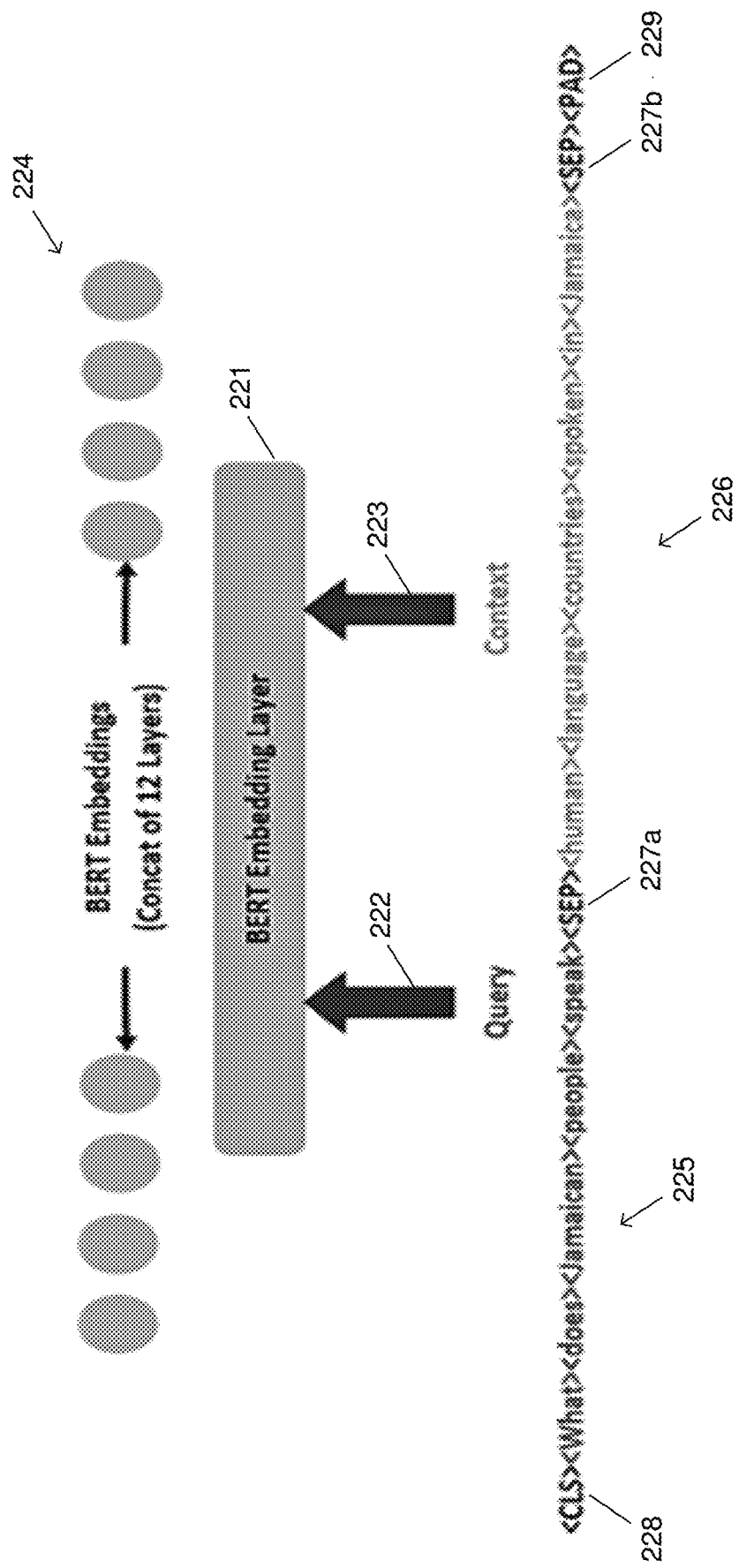
FIG. 2C is a block diagram illustrating an example, non-limiting embodiment of an embedding layer functioning within natural language, question, and answer system of FIGS. 2A and 2B in accordance with various aspects described herein.

FIG. 2C is a block diagram illustrating an example, non-limiting embodiment of an embedding layer 220 functioning within natural language, question, and answer system of FIGS. 2A and 2B in accordance with various aspects described herein. The query 232 is composed of a number of words $q_i$. The embedding layer 220 includes a BERT embedding layer 221 that accepts a first input obtained from a query 222 and a second input obtained from a context 223 of a candidate answer. The BERT embedding layer may generate an output responsive to the query and context inputs and determined according to pretraining and/or fine-tuning that may have been applied. The example BERT embedding layer includes 12 layers, with an output 224 being a concatenation of the 12 layers.

According to the illustrative example, an input to the BERT embedding layer 221 includes a query portion 222 having one or more words 225, e.g., the words "what," "does," "jamaican," "people," "speak." The example input to the BERT embedding layer 221 also includes a context portion 223 that provides a context of a first candidate answer. That is, the input includes an answer context portion 223 that includes one or more words 226, e.g., the words "human," "language," "countries," "spoken," "in," "jamaica." Alternatively or in addition, the input to the BERT embedding layer 221 may include one or more special keywords or tokens, such as a keyword <CLS> 228 appended to the question portion 222, and other special tokens or keywords <SEP> 227a, 227b, generally 227, appended to each of the question portion 222 and the answer context portion 223 of the first candidate answer. The <SEP> keyword(s) 227 from a BERT language model may be used to indicate separations between two or more sentences and/or sentence fragments and/or phrases that are being encoded. Sentences, sentence fragments and/or phrases that are encoded with one or more <SEP> keywords are contextually independent. In at least some embodiments, the input to the BERT embedding layer 221 may include a padding value, illustrated as a special <PAD> token or keyword 229.

According to the illustrative example, a <PAD> keyword 229 has been appended to the end of the question portion 222 and the answer context portion 223. For example, the <PAD> keyword 229 may be included to ensure that the input question portion 222 and answer context portion 223 satisfy any parameter requirements as may be imposed by the BERT embedding layer 221. For example, the <PAD> keyword 229 has been added to ensure the input to the BERT embedding layer meets model hyper parameter requirements. In more detail, limitations may be imposed on an input to the BERT embedding layer, such that a length of the question portion 222 is set to 18. Should a question portion 222 have fewer words than the set value, e.g., 18, the question portion 222 may be padded with special characters, e.g., "dummy" characters represented by the <PAD> keyword(s) 229.

Figure 2D:
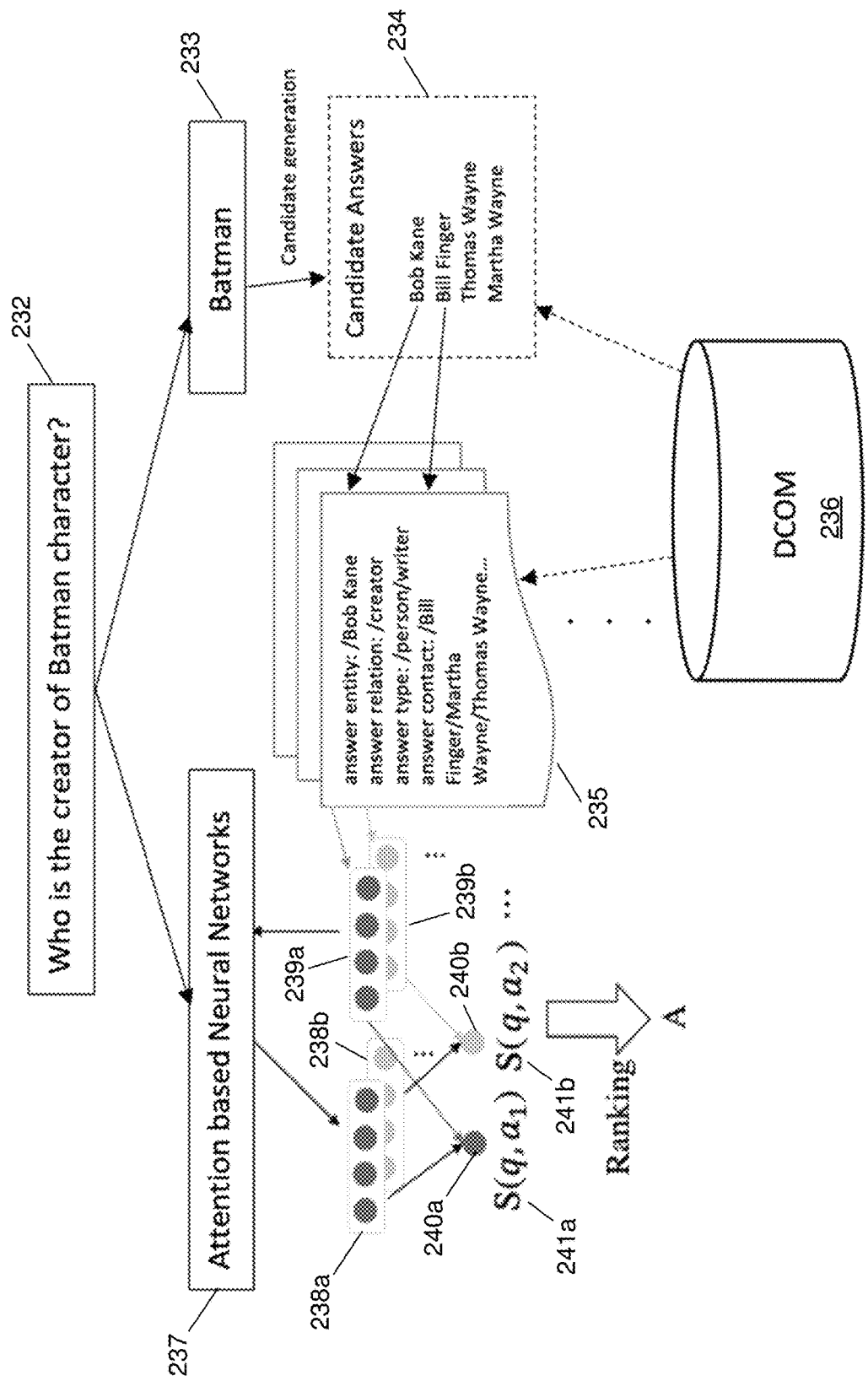
FIG. 2D is a block diagram illustrating an example, non-limiting embodiment of a knowledge base question answer (KB-QA) system functioning within natural language, question, and answer system of FIGS. 2A and 2B in accordance with various aspects described herein.

In at least some embodiments, a focused, context-query attention layer may be used on top of the pre-trained BERT embeddings. The term C is used to denote a context obtained from the knowledge base and the term Q for a natural language question posed to the QA system. The context-to-query attention may be constructed as follows: (i) compute similarities between each pair of context and query words that generates a similarity matrix $S \in R^{n*m}$; (ii) normalize each row of S by applying soft-max function; and (iii) compute context-to query attention $A = S \cdot QT \in R^{n*d}$. In at least some embodiments, tri-linear similarity function may be used: $f(q, c) = W_0[q, c, q \odot c]$ FIG. 2D is a block diagram illustrating an example, non-limiting embodiment of a knowledge base QA (KB-QA) system 230 functioning within natural language, question, and answer system of FIGS. 2A and 2B in accordance with various aspects described herein. The KB-QA system 230 includes a question module 232 adapted to receive a natural language question. The question module 232 is in communication with a candidate answer set generator 233 that generates a candidate set of answers from a knowledge graph 201 (FIG. 2A) responsive to the natural language question. For example, the candidate answer set generator 233 may be adapted to identify named entities within the natural language question, and further adapted to identify within the knowledge graph 201 the candidate answer set and possibly other related information. Information may include one or more of an answer type, an answer path, and an answer context.

According to the illustrative example, the question "Who is the creator of Batman character?" may be analyzed, e.g., using named entity recognition, to identify "Batman" as a primary named entity. The entity Batman® the fictional character may be located within a curated graph 236 within a domain of DC Comics® comic book publisher. In the graph, the entity Batman is connected to several other named entities. For example, Batman may be connected to "Bob Kane" entity node, a "Bill Finger" entity node, a "Thomas Wayne" entity node, and a "Martha Wayne" entity node. These and possibly other nodes within a two-hop distance from the Batman node may formulate a candidate answer set 234. Candidate answer information 235, including answer aspects, are extracted from the knowledge graph for each of the candidate answers. According to the illustrative example, candidate answer information 235 for the candidate answer "Bob Kane" may include an answer entity: "Bob Kane", an answer relation: "Creator", answer type: "person/writer", an answer context: "Bill Finger/Martha Wayne/Thomas Wayne/etc." The answer context may be determined according to neighboring nodes, or nodes sharing a common edge with the candidate answer node, e.g., "Bob Kane."

The KB-QA system 230 includes one or more attention based neural networks 237. For example, the neural networks include a cross-attention based neural network, that represents a question dynamically according to different answer aspects, also considering their connections. Each aspect of the answer focuses on different words of the question and thus decides how the question may be represented. Then the question pays different attention to each answer aspect to decide their weights.

First, the neural network 237 receives a representation of each word of the question 232, e.g., according to a question embedding matrix. Similarly, the neural network 237 receives an embedding for each answer aspect according to a trained knowledge base embedding matrix. Candidate answers 234, possibly including representations of the candidate answer information 235.

Candidate answers may be identified according to their proximity within the knowledge graph to a primary entity of the question as represented within the knowledge graph. A proximity may be predetermined, e.g., according to a number of paths or graph edges between the primary entity and the candidate answer. For example, a proximity may be predetermined as two-hops, such that all entities directly connected to the primary entity or connected to entities that are directly connected to the primary entity, will be selected, extracted and/or otherwise identified as candidate answers. It is envisioned that in some embodiments, a fixed proximity value may be established for all questions serviced by the KB-QA system 210. Alternatively or in addition, different fixed proximity requirements may be established according to one or more predetermined rules. For example, a rule-based proximity value may be determined according to one or more of an entity type, a question length, a user identity, a subscription level, processing and/or network conditions, such as processing and/or network capacity, load conditions.

The attention based neural network 237 may include a cross-attention mechanism, e.g., composed of two parts: an answer-towards-question attention part 238*a* and a question-towards-answer attention part 239*a*. In evaluating a candidate answer of the candidate answer set, a determination is made as to the answer type, and the question may be reread to determine which part of the question should be more focused, i.e., handling attention. Next, reread the question again in view of one of the aspects to determine which part of the question should be more focused to obtain a second question-towards-answer attention part 239*b* according to a second answer aspect, and this process repeated until all of the available aspects are utilized. Separate similarity scores, e.g., a first answer aspect 240*a* having a score $S(q, a_1)$ 241*a* and a second answer aspect 240*b* having score $S(q, a_2)$ 241*b* may be obtained for the question in view of each respective aspect, $a_1$, $a_2$, of the available aspects. In at least some embodiments, a final similarity score for one answer of the candidate answer set may be determined as a combination of the individual aspect similarity scores 241*a*, 241*b*, generally 241, e.g., a linear combination, such as a weighted sum of all of the available aspect similarity scores 241.

Figure 2E:
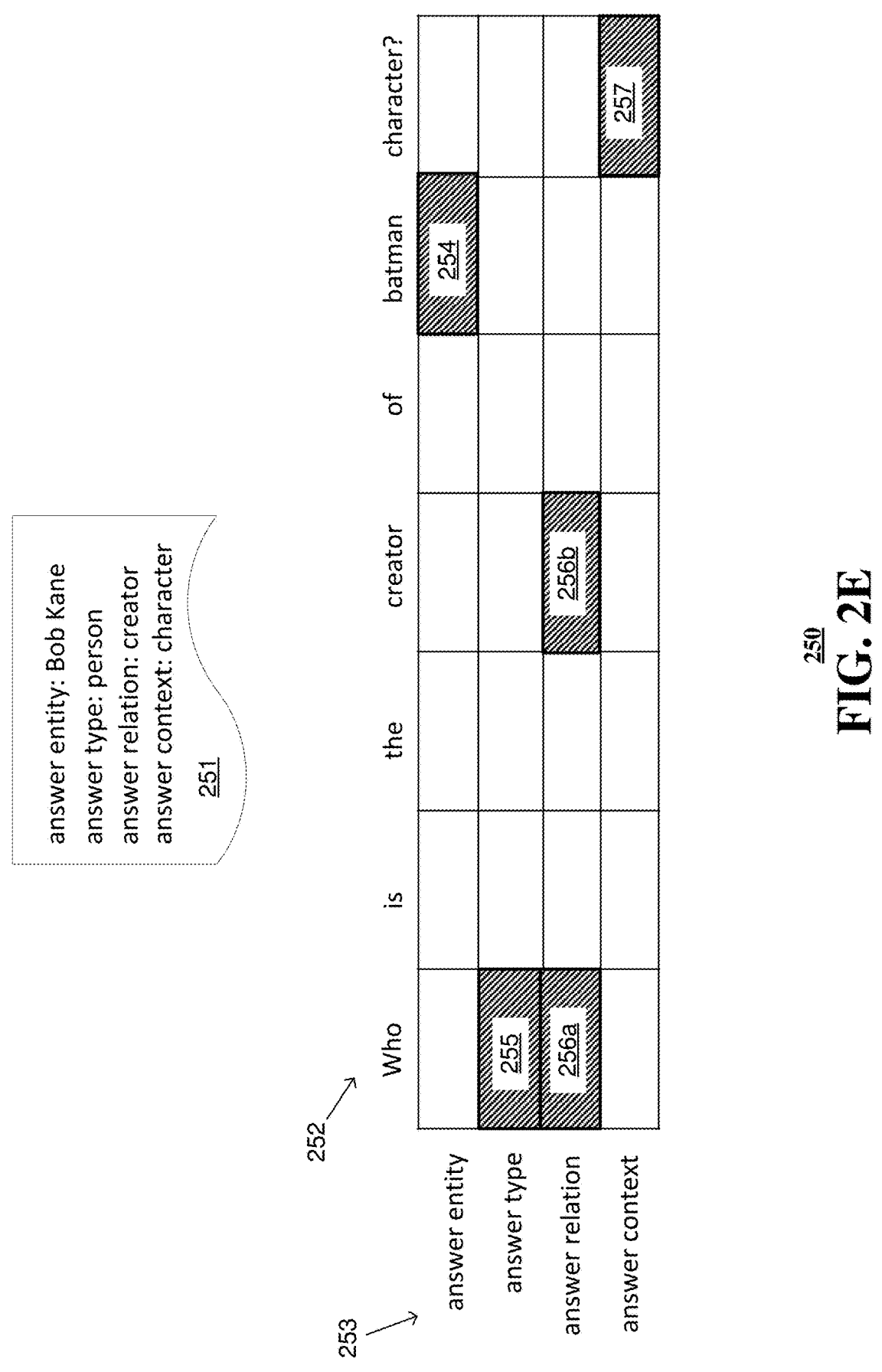

FIG. 2E is a schematic diagram illustrating an example of an attention weight table 250 determined according to a natural language, question and answer system functioning within the communication network of FIG. 2D in accordance with various aspects described herein. Entity information 251 of a member of a candidate answer set obtained from a knowledge graph 201 (FIG. 2A) may include, without limitation, an answer entity, an answer type, an answer relation, and an answer context. The answer entity may include a name, e.g., a person, place, or thing. According to the illustrative example, the answer entity is "Bob Kane." Bob Kane is a name of a person, so the answer type is "person." A relation, as may be determined from an edge or group of edges of the knowledge graph between the answer entity and the primary entity of the question. According to the illustrative example, the answer relation is "creator" as in Bob Kane is a creator of the Batman character of the DC Comics domain. Answer context may include additional information, e.g., other proximal nodes or entities of the knowledge graph.

As an illustration of attention weights that may result from an application of the neural networks 237 (FIG. 2D), the table 250 is shown with words 252 of the original question arranged across a top row of the table 250, and with different answer aspects 253 arranged along a left vertical column of the table 250. Shading is applied to cells of the table to indication an attention as may have been determined via the neural networks 237. According to the example, a first attention 254 is drawn to Batman, when interpreted in view of the answer entity type. Likewise, a second attention 255 is drawn to the pronoun who of the question in view of the answer type. "Who" corresponds to a person, so there is attention 255. Continuing with the example, third and fourth attentions 256*a* are drawn to the pronoun "who" and the term "creator" in view of the answer relation, as Bob Kane is also a creator, and the creator is a person. Finally, a fifth attention 257 is drawn to the word "character" as the answer context is a character.

Figure 2F:
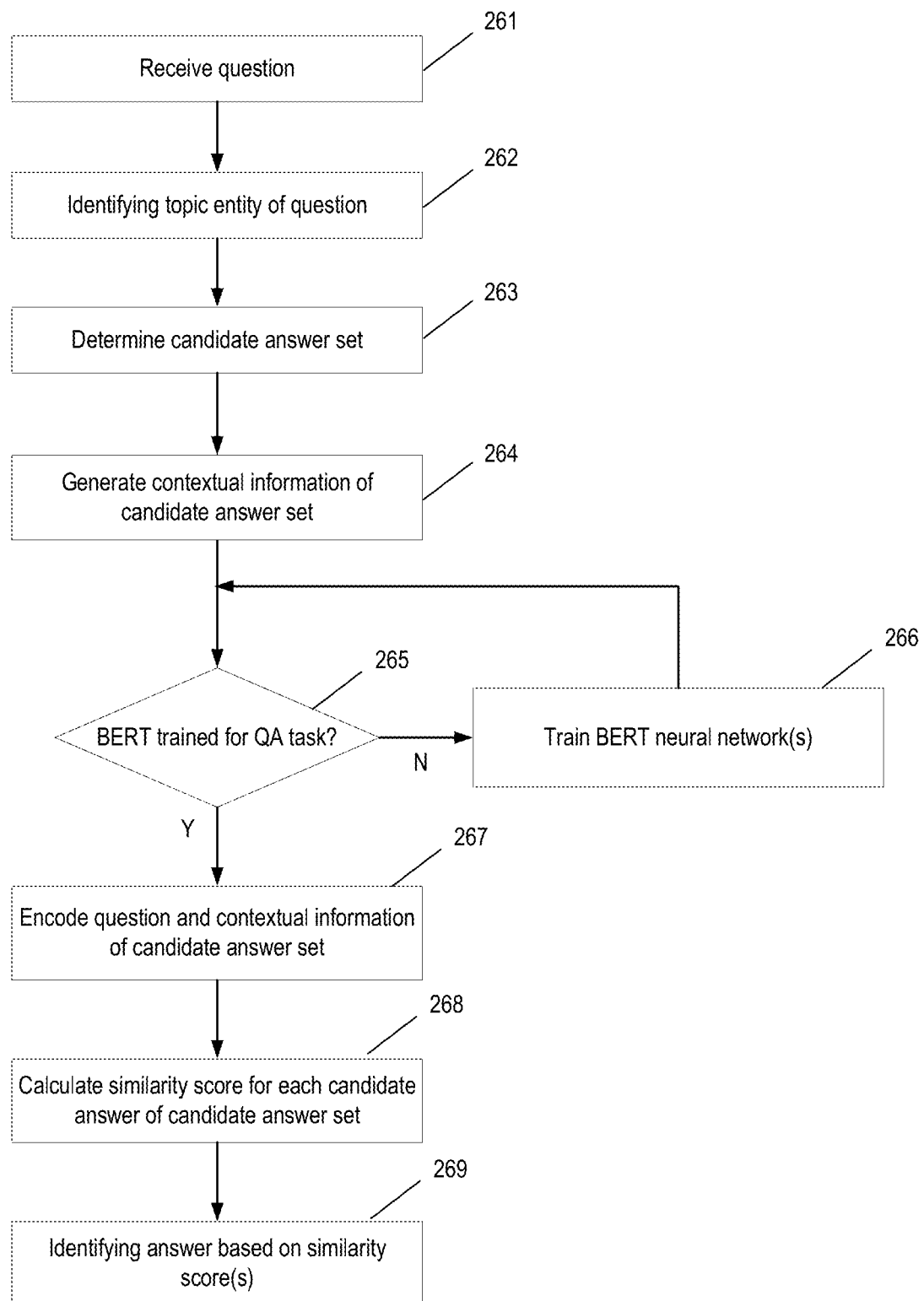
FIG. 2F depicts an illustrative embodiment of a natural language, question, and answer process in accordance with various aspects described herein.

FIG. 2F depicts an illustrative embodiment of a natural language, question, and answer process in accordance with various aspects described herein.

According to an illustrative example, a Web-Questions dataset may be built by using the Google Suggest API to obtain questions that begin with a "wh"-word and contain exactly one entity. Specifically, they queried the question excluding the entity, the phrase before the entity, or the phrase after it. Each query generates some number, e.g., five, candidate questions, which may be added to the queue. Further they iterated until some number of questions, e.g., 1 million questions, were visited. A random 100K may be submitted to an Amazon Mechanical Turk (AMT) task. The AMT task requested that the distributed workforce should answer the question using only the Freebase page of the questions' entity, or otherwise mark it as unanswerable by Freebase. The answer was restricted to be one of the possible entities, values, or list of the entities on the page. Thus, this combination of Web-Questions dataset with Freebase knowledge base was used as the base line.

To assess the example methodology, experiments were conducted on the Freebase knowledge base and the Web-Questions dataset. Freebase is large-scale knowledge base that has organized general facts as subject-predicate-object triples. At the time of the experiment disclosed herein, Freebase had about 41M non-numeric entities, with about 19K unique properties, and 596M assertions. At the time of the experiment disclosed herein, the Web-Questions dataset had about 3,778 question-answer pairs for training and about 2,032 for testing. The questions were gathered from Google Suggest API, and the answers from Amazon Mechanical Turk, which were labelled manually. All of the answers are from the Freebase knowledge base. About 80% of the training data was used as a training set and about 20% as a validate set. An Fi score was used as an evaluation metric, an average result was calculated by script.

A pre-trained BERT embeddings base uncased version was used for knowledge base-QA training. During tokenization, BERT code uses a word-piece algorithm to split words into sub-words and all less frequent words will be split into two or more sub-words. The vocabulary size of BERT was 30522. A delexicalization strategy was adopted. For each question, the candidate entity mentions those belonging to date, ordinal, or number are replaced with their type. Same is applied on answer context from knowledge base text if the overlap belongs to above type. This assures that the query matches up with answer context in the embedding space.

The dropout rates for both question-and-answer encoder side was set to 0.3. The bath size was set as 4 and answer module threshold was set to 0.7 to allow multiple answers for questions with list of answers. An Adam optimizer was used to train the model. The initial learning rate was set to 0.01. A further learning rate was reduced, e.g., by a factor of 10, if no improvement was observed in validation process for some number, e.g., three, successive epochs. The hyper-parameters were tuned on validation-set.

TABLE I

Evaluation results on Web-Questions

| Methods | Avg. $F_1$ |
| --- | --- |
| Bordes 2014b | 29.7 |
| Bordes 2014a | 39.2 |
| Yang 2014 | 41.3 |
| Dong 2015 | 40.8 |
| Bordes 2015 | 42.2 |
| Xu 2016 | 42.2 |
| Hao 2017 | 42.2 |
| Chen 2019 | 49.7 |
| Chen 2019 topic entity predictor | 51.8 |
| Inventive Approach | 52.7 |

Results were obtained by comparing a performance of example technique with other information-retrieval (IR) based approaches. The results are presented in Table 1. Based on the tabulated results, the example approach (LMKB-QA) obtained an $F_1$ score of 50.9 on Web-Questions using the topic entity predicted by Freebase API. According to Table 1, the proposed technique achieves better results or even competes with state-of-the-art. This demonstrates an effectiveness using BERT pre-trained language model embeddings in a Question Answering on Knowledge Base problem.

In at least some embodiments, the QA systems are based on a CNN architecture, and only depend on training data, without depending on other information, such as Wiki text. The approach may apply a bag-of-words (BOW) technique that models text, such as the question, or candidate answer, as a "bag of words" without regard of grammar or word order but keeping multiplicity. The BOW technique may be applied to obtain a single vector for both questions and answers. The QA systems disclosed herein may utilize sub-graph embeddings. Besides an answer path, a sub-graph may contain some or all of the entities and relations connected to the answer entity. A final vector may also be obtained according to a BOW strategy.

The example QA systems and processes incorporate pre-trained BERT language model embeddings that are fine-tuned for a KB-QA task using an encoder architecture with multi-head attention. This approach takes advantage of pre-trained language model embeddings. Solutions may utilize three fixed CNNs to represent questions. This approach implements a mutual influence between the representation of questions and the corresponding answer aspects. Results may be further enhanced by using memory networks to control the mutual influence between the representation of questions and the corresponding answer aspects. In an example application, the aforementioned approach in achieved an Fi score of 0.518 using a custom topic entity predictor while an $F_1$ score of 0.497 has achieved via the Freebase Search API.

FIG. 2G depicts an illustrative embodiment of another natural language, question and answer (QA) process 260 in accordance with various aspects described herein. The QA process 260 accepts a natural language question q, and returns an entity set A as answers. According to the QA process 260, a question is received at 261. The question may be obtained from a user interface, e.g., as a textual input, as a menu selection, as a graphical icon selection and/or a spoken phrase. In a pre-processing phase, a format of the question may be adapted to facilitate further processing of the question. For example, a spoken question may be converted to text using a speech-to-text converter. Alternatively or in addition, a menu selection and/or graphical icon selection may prompt a submission of a corresponding textual phrase corresponding to the question.

The natural language question may include a logical arrangement of words. The words may include names of persons, places or things, pronouns and/or other words that may relate to the named entities, and other words or phrase of a descriptive and/or supporting nature. At least some of the words may relate to a predicate. The natural language question may be evaluated at 262 to identify a topic entity of the question is identified at 262. For example, question may include more than one entity. The words may be used according to an API over a knowledge graph to return named entities. A logic and/or rule may be applied to identify a topic entity, when more than one entity is included in the sentence. In at least some embodiments, the process includes a coreference resolution to identify multiple words of a question that may relate to the same entity, e.g., a noun and a corresponding pronoun with the sentence referring to the same named entity.

A candidate answer set is determined at 263. In at least some embodiments, the candidate answer set is determined according to a knowledge graph. For example, the primary entity, once determined, is located as a node of a knowledge graph. Each node of the graph represents an entity. The nodes, or entities, are interconnected along edges. The edges may represent relationships among the nodes. In some embodiments, the candidate answer set is identified as entities associated with all nodes of the knowledge graph that are directly connected to a node of the primary entity. Alternatively or in addition, the candidate answer set may be identified as entities associated with all nodes of the knowledge graph that are directly connected to a node of the primary entity or connected to the node of the primary entity via some predetermined number of hops along the graph, e.g., two hops from the node of the primary entity.

Contextual information of the candidate answer set is generated at 264. For example, the contextual information includes information obtained from the knowledge graph, such as various aspects of the answer. Example aspects may include an answer type, an answer relation, an answer context, e.g., what other nodes may be connected to an entity node of the candidate answer, and so on.

A determination is made at 265 as to whether a neural network is trained. In some embodiments, the training determination may be based upon a record, e.g., a record identifying a training history of the neural network(s). The training record may include a date and/or a time of the training, an extent or scope of the training, a measure of an effectiveness of the training, and the like.

To the extent it is determined that the neural network is not trained, a training process is initiated at 266. Training of the neural network may include any of the various training techniques disclosed herein and/or otherwise known to those skilled in the art. After initiating the training process, the process returns to determine whether the neural network is trained at 265.

To the extent it is determined that the neural network is trained, a question and contextual information of a candidate answer set is encoded at 267. Encoding may include embedding the question in a question embedding matrix. The question embedding matrix may include information as to word location, word type, word fragments, including characters, and the like.

A similarity score is calculated at 268 for each candidate answer of the candidate answer set. The similarity score may be determined as a weighted sum of similarity scores of each of the various candidate answer contexts. The similarity score of a particular candidate answer is determined in view of the question and the particular candidate answer. Higher score values may indicate a greater similarity between the question and the particular candidate answer.

An answer to the question may be identified at 269 based on the similarity score(s). For example, a similarity score exceeding a threshold value may be identified and/or otherwise qualify as an answer. To the extent more than one candidate answers satisfy a similarity score threshold, an answer group or answer subset of the candidate answers may be provided as answer(s) to the question.

While for purposes of simplicity of explanation, the respective processes are shown and described as a series of blocks in FIGS. 2F and 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It is understood that increasing model size when pretraining natural language representations may improve performance on downstream tasks. However, at some point further model increases may become harder due to graphic processing unit (GPU)/tensor processing unit (TPU) memory limitations and longer training times. The system, devices, techniques and software disclosed herein may be applied in a manner that is well suited to operation on or with processing devices having low resources, e.g., limitations of one or more of processing power, memory capacity, storage capacity, supply power, communication channel capacity, and so on. For example, low-memory variants of the BERT language model for self-supervised learning of language representations, such as distillBERT, a distilled version of BERT, ALBRET, another "lite" version of BERT, and/or the ELECTRA model applying a pretraining approach that trains two transformer models, i.e., a generator and a discriminator. According to the ELECTRA model, a generator may be used to replace tokens in a sequence, e.g., being trained as a masked language model. The discriminator model may be operated in a manner that attempts to identify which tokens were replaced by the generator in the sequence.

Alternatively or in addition, other features adapted to facilitate operation of the natural language QA system may include, without limitation, one or more of curating and/or maintaining one or more domain specific knowledge graphs, applying one or more BERT embedding layers, such as those disclosed herein. In at least some embodiments, context generation rules that limit a number of neighboring nodes, e.g., 2-hops, may further facilitate implementation of the natural language QA system on smaller and/or more limited functionality and/or capacity processing devices. According to the disclosed techniques, a natural language QA system may be implemented on one or more of a laptop computer, a tablet processing device, or another mobile device, such as a smartphone or a smart appliance, e.g., a smart TV.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and process 260 presented in FIGS. 1, 2A-2G, and 3. For example, virtualized communication network 300 can facilitate in whole or in part a bidirectional encoder representation from transformers (BERT) that incorporates pre-trained language model embeddings to encode a question and candidate answer contexts from a knowledge base. The BERT may be pretrained in a general manner that is not directed to any particular task, and subsequently, fine-tuned for a question answer (QA) task, using a multi-head attention mechanism based on a convolution neural network encoder. At least some of the example architectures disclosed herein are based on a bi-directional, cross attention mechanism between an encoded representation of the asked question and an encoded representation of answer contexts obtained from the knowledge base.

In more detail, the example system 300 includes a storage device 381 adapted to store knowledge base information, e.g., in the form of a knowledge graph. The storage device 381 may be part of a knowledge base management system 380 that includes the storage device 381 and at least one knowledge base (KB) controller, e.g., a KB server 382 adapted to access, maintain and/or otherwise modify the knowledge graph.

The example system 300 further includes a question-answer system 383 adapted to determine answers to natural language questions from information maintained by the knowledge base management system 380. For example, the system 300 may include a question answer (QA) server 383 hosting a back-end question-answer service. The QA server 383 receives a query via the virtualized network function cloud 325, processes the query and generates an answer according to information maintained by the knowledge base management system. In some embodiments, the QA server 383 is collocated with the storage device 381. For example, functionality of the QA server 383 and the KB server 382 may be hosted within a common server. Alternatively or in addition, the storage device 381 may be independently accessible via a separate controller, such as an independent server 382, via the virtualized network function cloud 325. More generally, one or more of the KB server 382, the storage device 381 or the QA server 383 may be in communication with the virtualized network function cloud 325 and otherwise accessible via one or more of the broadband access 110, the voice access 130, the wireless access 120 or the media access 140.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers, and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
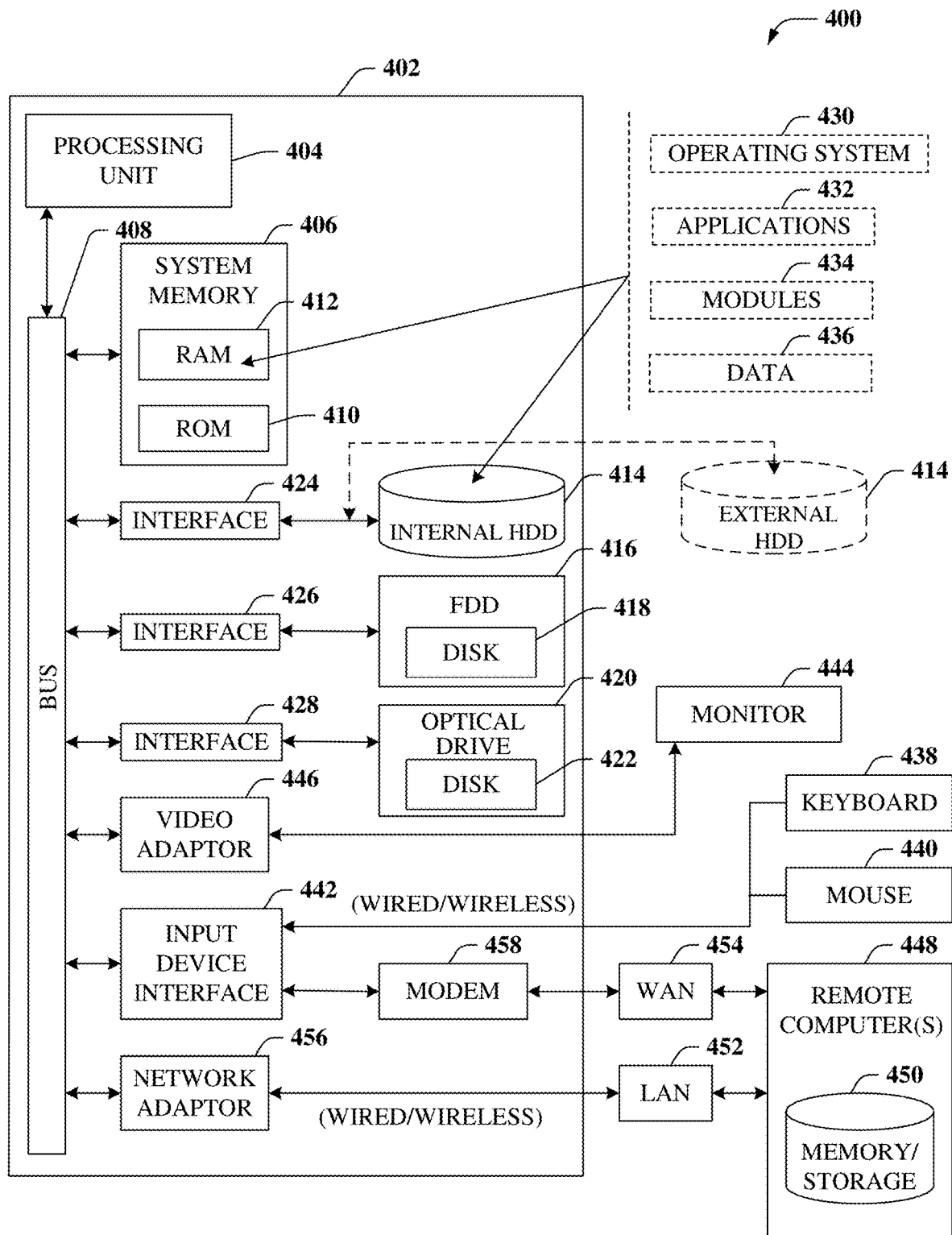
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a bidirectional encoder representation from transformers (BERT) that incorporates pretrained language model embeddings to encode a question and candidate answer contexts from a knowledge base. The BERT may be pretrained in a general manner that is not directed to any particular task, and subsequently, fine-tuned for a question answer (QA) task, using a multi-head attention mechanism based on a convolution neural network encoder. At least some of the example architectures disclosed herein are based on a bi-directional, cross attention mechanism between an encoded representation of the asked question and an encoded representation of answer contexts obtained from the knowledge base.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
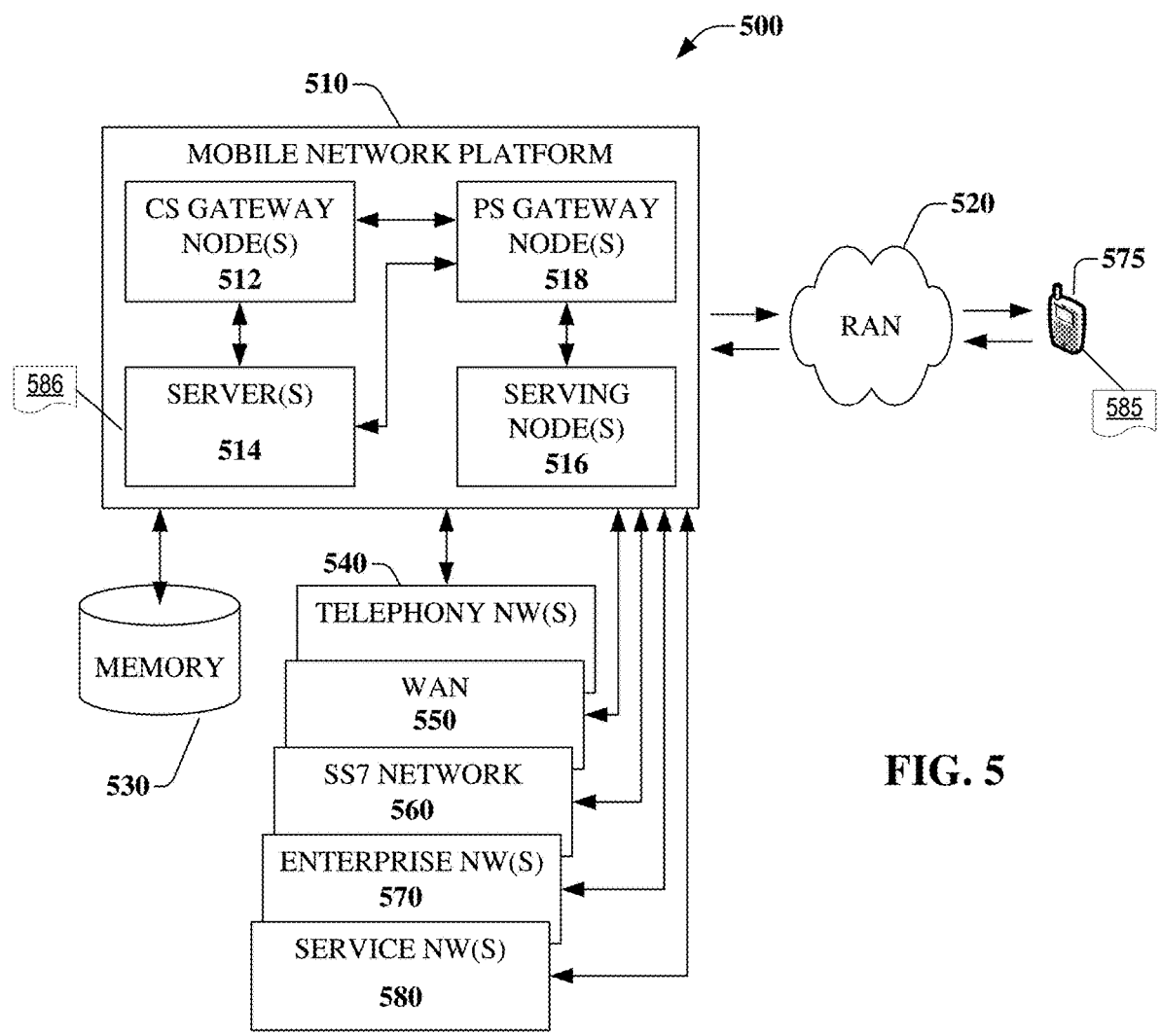
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a bidirectional encoder representation from transformers (BERT) that incorporates pre-trained language model embeddings to encode a question and candidate answer contexts from a knowledge base. The BERT may be pretrained in a general manner that is not directed to any particular task, and subsequently, fine-tuned for a question answer (QA) task, using a multi-head attention mechanism based on a convolution neural network encoder. At least some of the example architectures disclosed herein are based on a bi-directional, cross attention mechanism between an encoded representation of the asked question and an encoded representation of answer contexts obtained from the knowledge base. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s)

518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

In at least some embodiments, the mobile network platform 510, e.g., the servers 514, may include functionality, e.g., stored computer executable instructions and/or application programs or apps adapted to perform one or more of the QA functions and/or the knowledge graph functions disclosed herein. Alternatively or in addition, the mobile device 575 may include functionality, e.g., stored computer executable instructions and/or application programs or apps adapted to perform one or more of the QA functions, a user interface, and/or the knowledge graph functions disclosed herein.

Figure 6:
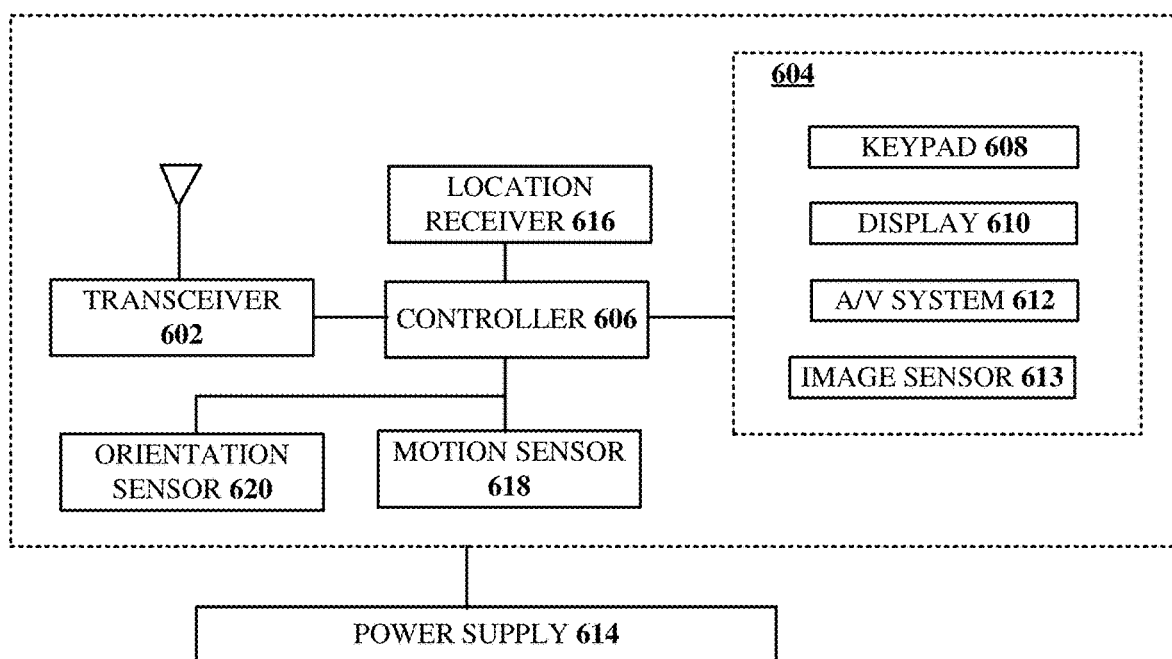
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a bidirectional encoder representation from transformers (BERT) that incorporates pre-trained language model embeddings to encode a question and candidate answer contexts from a knowledge base. The BERT may be pre-trained in a general manner that is not directed to any particular task, and subsequently, fine-tuned for a question answer (QA) task, using a multi-head attention mechanism based on a convolution neural network encoder. At least some of the example architectures disclosed herein are based on a bi-directional, cross attention mechanism between an encoded representation of the asked question and an encoded representation of answer contexts obtained from the knowledge base.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM, or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4, \ldots, x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches, and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature, or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:
1. A method, comprising:
  receiving, by a processing system including a processor, a natural language question;
  identifying, by the processing system and without human intervention, a topic entity of the natural language question;
  locating, by the processing system and within a knowledge graph, a focal node corresponding to the topic entity;

gathering, by the processing system and within the knowledge graph, a candidate answer set comprising a group of other entities within a predetermined proximity to the focal node;

generating, by the processing system and from the knowledge graph, contextual information for the group of other entities of the candidate answer set, wherein the contextual information comprises a respective answer type of each of the other entities of the candidate answer set;

encoding, by the processing system, the natural language question, and the contextual information of the group of other entities of the candidate answer set to obtain an encoded vectorial representation of the natural language question and a plurality of encoded vectorial representations of the candidate answer set, wherein the encoding uses pre-trained language model embeddings obtained via a pre-trained bidirectional encoder representations from transformer (BERT) encoder;

scoring, by the processing system, the encoded vectorial representation of the natural language question under an influence of the contextual information to obtain score values, wherein the scoring involves evaluations of cross-attention between the natural language question and the respective answer type of each of the other entities of the candidate answer set; and selecting, by the processing system and based on the scoring, one of the other entities of the candidate answer set to obtain a selected one of the candidate answer set as an answer to the natural language question.

2. The method of claim 1, further comprising:
training, by the processing system, the BERT encoder, wherein the training comprises a pretraining phase and a fine-tuning phase.

3. The method of claim 2, wherein pre-training phase further comprises:
pre-training, by the processing system, the BERT encoder according to a masked language modeling process adapted to predict missing tokens from their placeholders in a given sequence.

4. The method of claim 2, wherein the fine-tuning phase further comprises:
training the BERT encoder according to a next sentence prediction outcome task.

5. The method of claim 1, wherein the scoring further comprises:
computing a dot product of the encoded vectorial representation of the natural language question and the plurality of encoded vectorial representations of the candidate answer set to obtain a computed score value.

6. The method of claim 1, wherein the selecting of the one of the other entities of the candidate answer set further comprises:
comparing a computed score value associated with the one of the other entities of the candidate answer set to a score threshold value; and
selecting the one of the other entities of the candidate answer set responsive to the computed score value exceeding the score threshold value.

7. The method of claim 1, wherein the encoding further comprises fine-tuning of BERT encoding according to a self multi-head attention encoder based on a convolutional neural network (CNN) encoder.

8. The method of claim 1, wherein the contextual information further comprises a respective answer path and a respective answer context of each of the other entities of the candidate answer set.

9. The method of claim 1, wherein the respective answer type of each of the other entities of the candidate answer set comprises an indication of whether that other entity is a person, a place, or a thing.

10. The method of claim 1, wherein the knowledge graph comprises a domain-specific knowledge graph, and wherein the domain-specific knowledge graph comprises entities associated with a predetermined domain and relationships among the entities.

11. The method of claim 10, wherein the domain-specific knowledge graph comprises a curated knowledge graph, the method further comprising:
determining, by the processing system, a missing entity not included within the domain-specific knowledge graph;
searching, by the processing system, a knowledge base other than the domain-specific knowledge graph to obtain missing entity information according to the missing entity; and
incorporating, by the processing system, a new entity comprising the missing entity information into the domain-specific knowledge graph to obtain an updated, curated domain-specific knowledge graph.

12. A device, comprising:
a processing system including a processor; and
a memory that stores executable instructions that, when executed by the processing system, facilitate performance of operations, the operations comprising:
identifying, without human intervention, a main entity of a natural language question;
locating, within a knowledge graph, a focal node corresponding to the main entity;
identifying, within the knowledge graph, a candidate answer set comprising a group of other entities within a predetermined proximity to the focal node;
extracting, from the knowledge graph, contextual information for the group of other entities of the candidate answer set, wherein the contextual information comprises a respective answer type of each of the other entities of the candidate answer set;
encoding the natural language question and the contextual information of the group of other entities of the candidate answer set to obtain an encoded vectorial representation of the natural language question and a plurality of encoded vectorial representations of the candidate answer set, wherein the encoding uses pre-trained language model embeddings obtained via a bidirectional encoder representations from transformer (BERT) encoding process;
scoring the encoded vectorial representation of the natural language question under an influence of the contextual information to obtain score values, wherein the scoring involves evaluations of cross-attention between the natural language question and the respective answer type of each of the other entities of the candidate answer set; and
selecting, based on the scoring, one of the other entities of the candidate answer set to obtain a selected one of the candidate answer set as an answer to the natural language question.

13. The device of claim 12, wherein the contextual information further comprises a respective answer path and a respective answer context of each of the other entities of the candidate answer set.

14. The device of claim 13, wherein the respective answer type of each of the other entities of the candidate answer set comprises an indication of whether that other entity is a person, a place, or a thing.

15. The device of claim 12, wherein the knowledge graph comprises a domain-specific knowledge graph, and wherein the domain-specific knowledge graph comprises entities associated with a predetermined domain and relationships among the entities.

16. The device of claim 12, wherein the operations further comprise:
fine-tuning BERT encoding according to a self multi-head attention encoder based on a convolutional neural network (CNN) encoder.

17. A non-transitory, machine-readable medium, comprising executable instructions that, when executed by a processing system including a processor, facilitate performance of operations, the operations comprising:
identifying an entity of a natural language question;
locating, within a knowledge graph, a node corresponding to the entity;
generating a candidate answer set comprising a group of other entities located a predetermined proximity to the node within the knowledge graph;
determining, from the knowledge graph, contextual information for the group of other entities of the candidate answer set, wherein the contextual information comprises a respective answer type of each of the other entities of the candidate answer set;
encoding the natural language question and the contextual information of the group of other entities of the candidate answer set to obtain an encoded vectorial representation of the natural language question and an encoded vectorial representation of the candidate answer set, wherein the encoding uses pre-trained language model embeddings obtained via a bidirectional encoder representations from transformer (BERT) encoding process;
scoring the encoded vectorial representation of the natural language question under an influence of the contextual information to obtain score values, wherein the scoring involves evaluations of cross-attention between the natural language question and each aspect of the respective answer type of each of the other entities of the candidate answer set; and
selecting, based on the scoring, one of the other entities of the candidate answer set to obtain a selected one of the candidate answer set as an answer to the natural language question.

18. The non-transitory, machine-readable medium of claim 17, wherein the contextual information further comprises a respective answer path and a respective answer context of each of the other entities of the candidate answer set.

19. The non-transitory, machine-readable medium of claim 18, wherein the respective answer type of each of the other entities of the candidate answer set comprises an indication of whether that other entity is a person, a place, or a thing.

20. The non-transitory, machine-readable medium of claim 17, wherein the knowledge graph comprises a domain-specific knowledge graph, and wherein the domain-specific knowledge graph comprises entities associated with a predetermined domain and relationships among the entities.

* * * * *